United States Patent
Suzuki et al.

(10) Patent No.: US 10,230,822 B2
(45) Date of Patent: Mar. 12, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Shunsuke Suzuki, Tokyo (JP); Masahiro Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 86 days.

(21) Appl. No.: 15/119,166

(22) PCT Filed: Nov. 26, 2014

(86) PCT No.: PCT/JP2014/081234
§ 371 (c)(1),
(2) Date: Aug. 16, 2016

(87) PCT Pub. No.: WO2015/125369
PCT Pub. Date: Aug. 27, 2015

(65) Prior Publication Data
US 2017/0019505 A1    Jan. 19, 2017

(30) Foreign Application Priority Data
Feb. 24, 2014  (JP) .................................. 2014-032711

(51) Int. Cl.
*H04L 29/06*  (2006.01)
*G06Q 10/10*  (2012.01)
*H04L 29/08*  (2006.01)

(52) U.S. Cl.
CPC ............. *H04L 67/42* (2013.01); *G06Q 10/10* (2013.01); *H04L 67/1085* (2013.01); *H04L 67/1097* (2013.01)

(58) Field of Classification Search
CPC . G06Q 10/10; H04L 67/1085; H04L 67/1097; H04L 67/42
See application file for complete search history.

(56) References Cited

U.S. PATENT DOCUMENTS

| | | | | |
|---|---|---|---|---|
| 7,299,415 | B2 * | 11/2007 | Opheim | G06F 9/453 715/705 |
| 2004/0027258 | A1 * | 2/2004 | Pechatnikov | G01C 21/26 340/995.1 |
| 2013/0093786 | A1 * | 4/2013 | Tanabe | H04N 5/76 345/619 |

(Continued)

OTHER PUBLICATIONS

International Search report on patentability received for PCT Application No. PCT/JP2014/081234, dated Feb. 24, 2015, 4 pages of report including 1 pages of English translation.

(Continued)

*Primary Examiner* — Oanh Duong
(74) *Attorney, Agent, or Firm* — Xsensus LLP

(57) ABSTRACT

An information processing apparatus including a data provision unit configured to provide, to a client apparatus, a first template corresponding to a selection request from the client apparatus, and a data processing unit configured to, in the case where a factor included in the first template and a factor included in a second template corresponding to a switching request from the client apparatus are common, associate data associated with the factor included in the first template with the factor included in the second template.

18 Claims, 31 Drawing Sheets

(56) References Cited

U.S. PATENT DOCUMENTS

| | | | | |
|---|---|---|---|---|
| 2013/0111373 A1* | 5/2013 | Kawanishi | .............. | G06T 11/60 |
| | | | | 715/762 |
| 2014/0075413 A1* | 3/2014 | Binjrajka | .................. | G06F 8/71 |
| | | | | 717/121 |
| 2014/0282218 A1* | 9/2014 | Kaufman | .............. | G06F 17/248 |
| | | | | 715/781 |
| 2015/0143210 A1* | 5/2015 | Lam | ...................... | G06F 17/248 |
| | | | | 715/202 |
| 2015/0178258 A1* | 6/2015 | Meschkat | ............. | G06F 17/241 |
| | | | | 715/230 |

OTHER PUBLICATIONS

Written Opinion received for PCT Application No. PCT/JP2014/081234, dated Feb. 24, 2015, 6 pages of report including 3 pages of English translation.

* cited by examiner

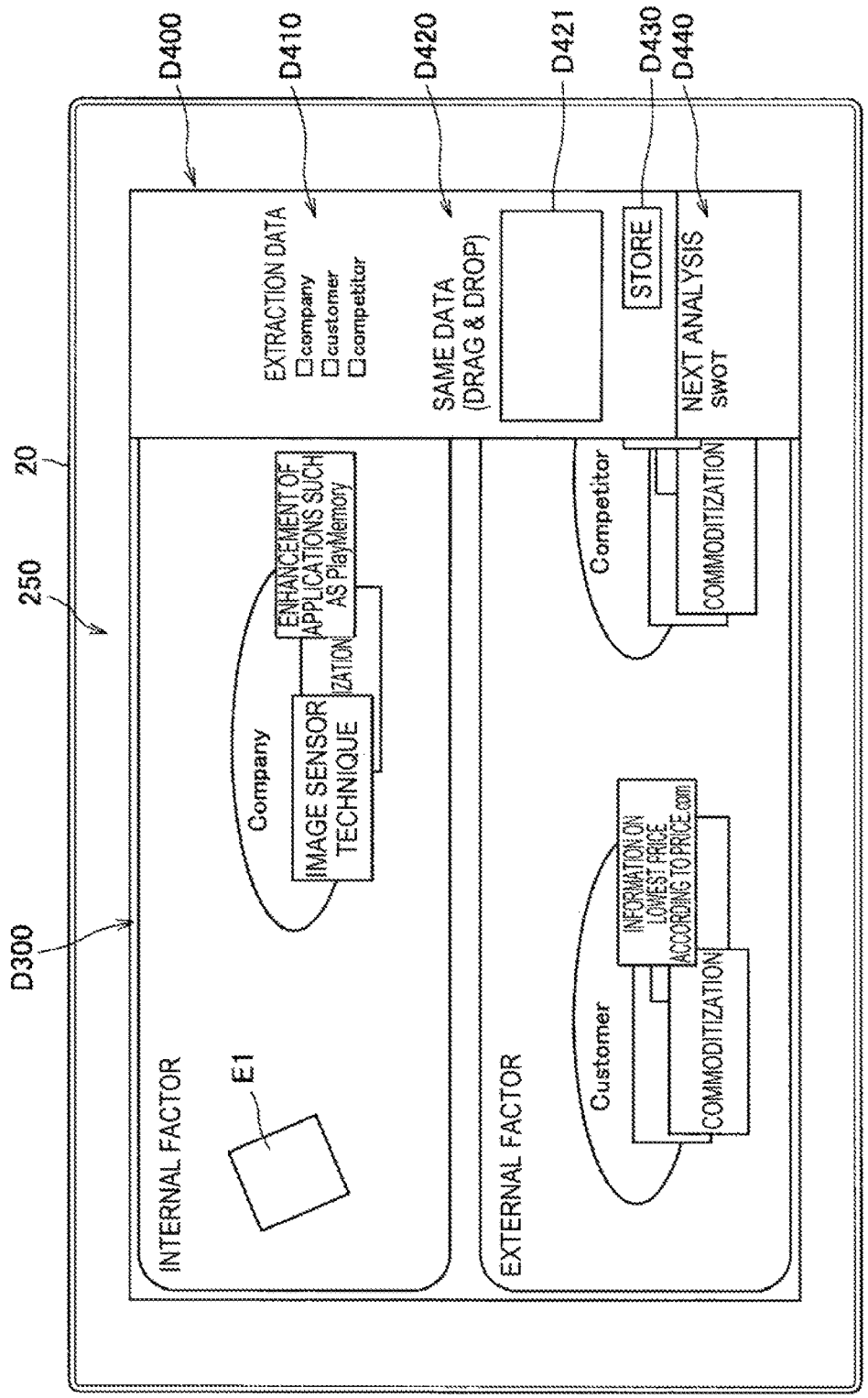

FIG. 7

| DATA ID | DATA | TEMPLATE | SELECTABLE FACTOR | COLOR | FACTOR |
|---|---|---|---|---|---|
| 00001 | IMAGE SENSOR TECHNIQUE | 3C | company | RED | INTERNAL FACTOR |
| 00002 | HOMOGENIZATION | 3C | company | RED | INTERNAL FACTOR |
| 00003 | ENHANCEMENT OF APPLICATIONS SUCH AS Playmemory | 3C | company | RED | INTERNAL FACTOR |
| 00004 | INFORMATION ON LOWEST PRICE ACCORDING TO PRICE.com | 3C | Customer | GREEN | EXTERNAL FACTOR |
| 00005 | PRICE CUT PRESSURE | 3C | Competitor | BLUE | EXTERNAL FACTOR |

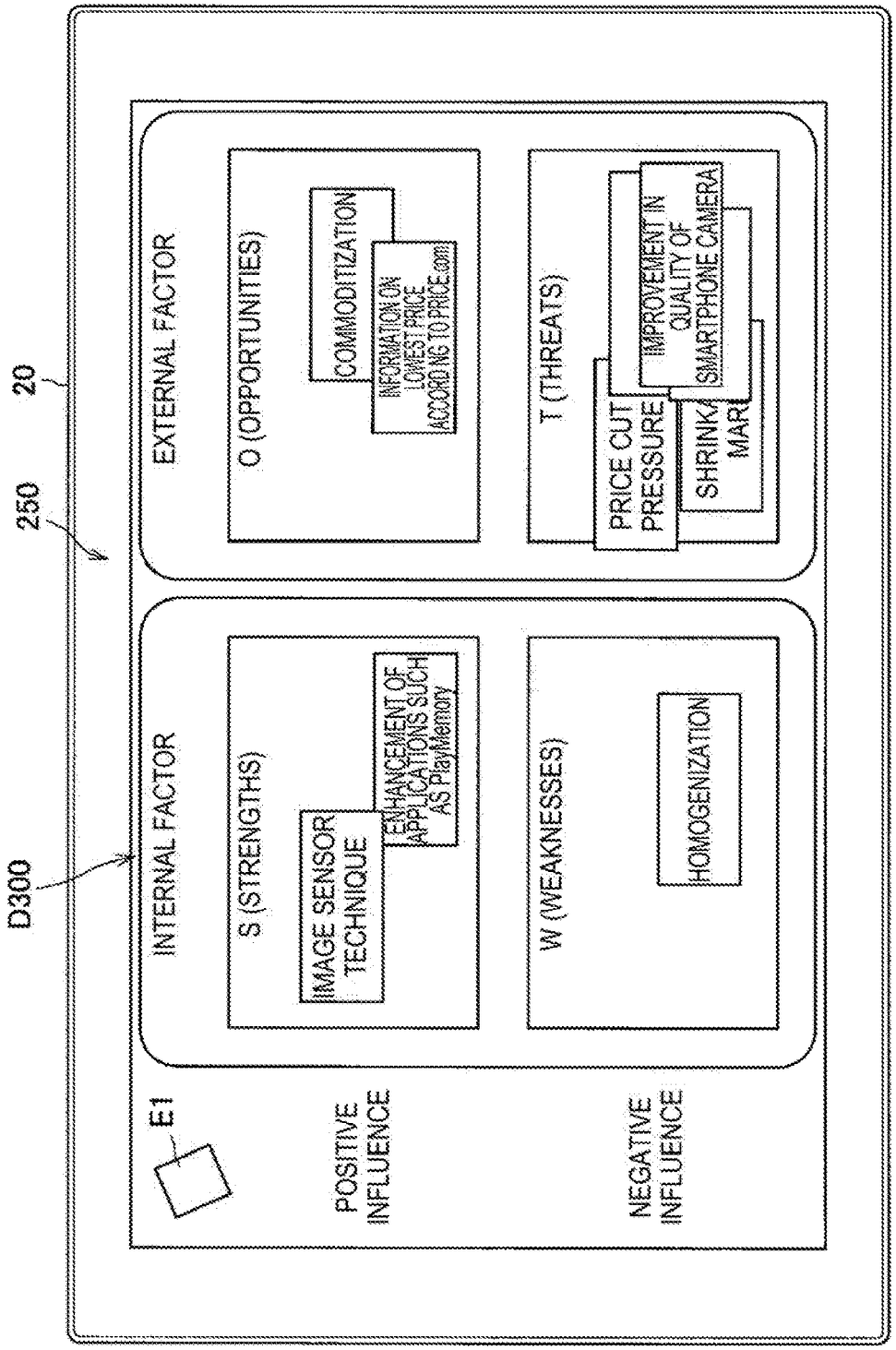

FIG. 9

| DATA ID | DATA | TEMPLATE | SELECTABLE FACTOR | COLOR | FACTOR |
|---|---|---|---|---|---|
| 00001_0001 | IMAGE SENSOR TECHNIQUE | SWOT | INTERNAL FACTOR | Default | Default |
| 00002_0002 | HOMOGENIZATION | SWOT | INTERNAL FACTOR | Default | Default |
| 00003_0003 | ENHANCEMENT OF APPLICATIONS SUCH AS Playmemory | SWOT | INTERNAL FACTOR | Default | Default |
| 00004_0004 | INFORMATION ON LOWEST PRICE ACCORDING TO PRICE.com | SWOT | EXTERNAL FACTOR | Default | Default |
| 00005_0005 | PRICE CUT PRESSURE | SWOT | EXTERNAL FACTOR | Default | Default |

FIG. 11

| DATA ID | DATA | TEMPLATE | SELECTABLE FACTOR | COLOR | FACTOR |
|---|---|---|---|---|---|
| 00001_0001 | IMAGE SENSOR TECHNIQUE | SWOT | INTERNAL FACTOR | RED | STRENGTHS |
| 00002_0002 | HOMOGENIZATION | SWOT | INTERNAL FACTOR | ORANGE | WEAKNESSES |
| 00003_0003 | ENHANCEMENT OF APPLICATIONS SUCH AS Playmemory | SWOT | INTERNAL FACTOR | RED | STRENGTHS |
| 00004_0004 | INFORMATION ON LOWEST PRICE ACCORDING TO PRICE.com | SWOT | EXTERNAL FACTOR | GREEN | OPPORTUNITIES |
| 00005_0005 | PRICE CUT PRESSURE | SWOT | EXTERNAL FACTOR | BLUE | THREATS |

FIG. 25

| NUMBER OF SOLD PRODUCTS (A AREA) | OCTOBER | NOVEMBER | DECEMBER | 3Q |
|---|---|---|---|---|
| DCS-XXX | 100 | 120 | 200 | 420 |
| NEX-YYY | 50 | 70 | 140 | 260 |

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2014/081234 filed on Nov. 26, 2014, which claims priority benefit of Japanese Patent Application No. 2014-032711 filed in the Japan Patent Office on Feb. 24, 2014. Each of the above-referenced applications is hereby incorporated herein by reference in its entirety.

TECHNICAL FIELD

The present disclosure relates to an information processing apparatus, an information processing method, and a program.

BACKGROUND ART

Recently, there has been disclosed a technique for downloading data uploaded in a server apparatus to a client apparatus and generating new data in the client apparatus by utilizing the downloaded data (see, for example, Patent Literature 1). There is also a technique for downloading a template uploaded in a server apparatus to a client apparatus and generating data in the client apparatus by utilizing the downloaded template.

CITATION LIST

Patent Literature

Patent Literature 1: JP 2009-163765A

SUMMARY OF INVENTION

Technical Problem

However, it is desired to provide a technique that allows a user to save time and effort required for generating data on the basis of another template with the use of data that has already been generated on the basis of one template.

Solution to Problem

According to the present disclosure, there is provided an information processing apparatus, including: a data provision unit configured to provide, to a client apparatus, a first template corresponding to a selection request from the client apparatus; and a data processing unit configured to, in the case where a factor included in the first template and a factor included in a second template corresponding to a switching request from the client apparatus are common, associate data associated with the factor included in the first template with the factor included in the second template.

According to the present disclosure, there is provided an information processing method, including: providing, to a client apparatus, a first template corresponding to a selection request from the client apparatus; and in the case where a factor included in the first template and a factor included in a second template corresponding to a switching request from the client apparatus are common, associating, by using a processor, data associated with the factor included in the first template with the factor included in the second template.

According to the present disclosure, there is provided a program for causing a computer to function as an information processing apparatus including a data provision unit configured to provide, to a client apparatus, a first template corresponding to a selection request from the client apparatus, and a data processing unit configured to, in the case where a factor included in the first template and a factor included in a second template corresponding to a switching request from the client apparatus are common, associate data associated with the factor included in the first template with the factor included in the second template.

Advantageous Effects of Invention

As described above, according to the present disclosure, a user can save time and effort required for generating data on the basis of another template with the use of data that has already been generated on the basis of one template. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 6 shows a display example of a 3C analysis template displayed after completion of data arrangement.

FIG. 7 shows examples of data associated with a 3C analysis template and information related to the data.

FIG. 8 shows a display example of a SWOT analysis template obtained by utilizing data associated with a 3C analysis template.

FIG. 9 shows examples of data associated with a SWOT analysis template and information (initial values) related to the data.

FIG. 11 shows examples of data associated with a SWOT analysis template and information (definitive values) related to the data.

FIG. 25 shows an example of storage data according to graph analysis.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets or numbers after the same reference sign. However, when there is no need in particular to distinguish structural elements that have substantially the same function and structure, the same reference sign alone is attached.

Note that description will be provided in the following order.

0. General Techniques
1. Configuration Example of Information Processing System
2. Functional Configuration Example of Server Apparatus
3. Functional Configuration Example of Client Apparatus
4. Detailed Functions of Information Processing System
5. Hardware Configuration Example of Server Apparatus
6. Hardware Configuration Example of Client Apparatus
7. Conclusion

0. GENERAL TECHNIQUES

General techniques will be described. Recently, there has been disclosed a technique for downloading data uploaded in a server apparatus to a client apparatus and generating new data in the client apparatus by utilizing the downloaded data. There is also a technique for downloading a template uploaded in a server apparatus to a client apparatus and generating data in the client apparatus by utilizing the downloaded template.

This specification mainly proposes a technique that allows a user to save time and effort required for generating data on the basis of another template with the use of data that has already been generated on the basis of one template.

1. CONFIGURATION EXAMPLE OF INFORMATION PROCESSING SYSTEM

Figure 1:
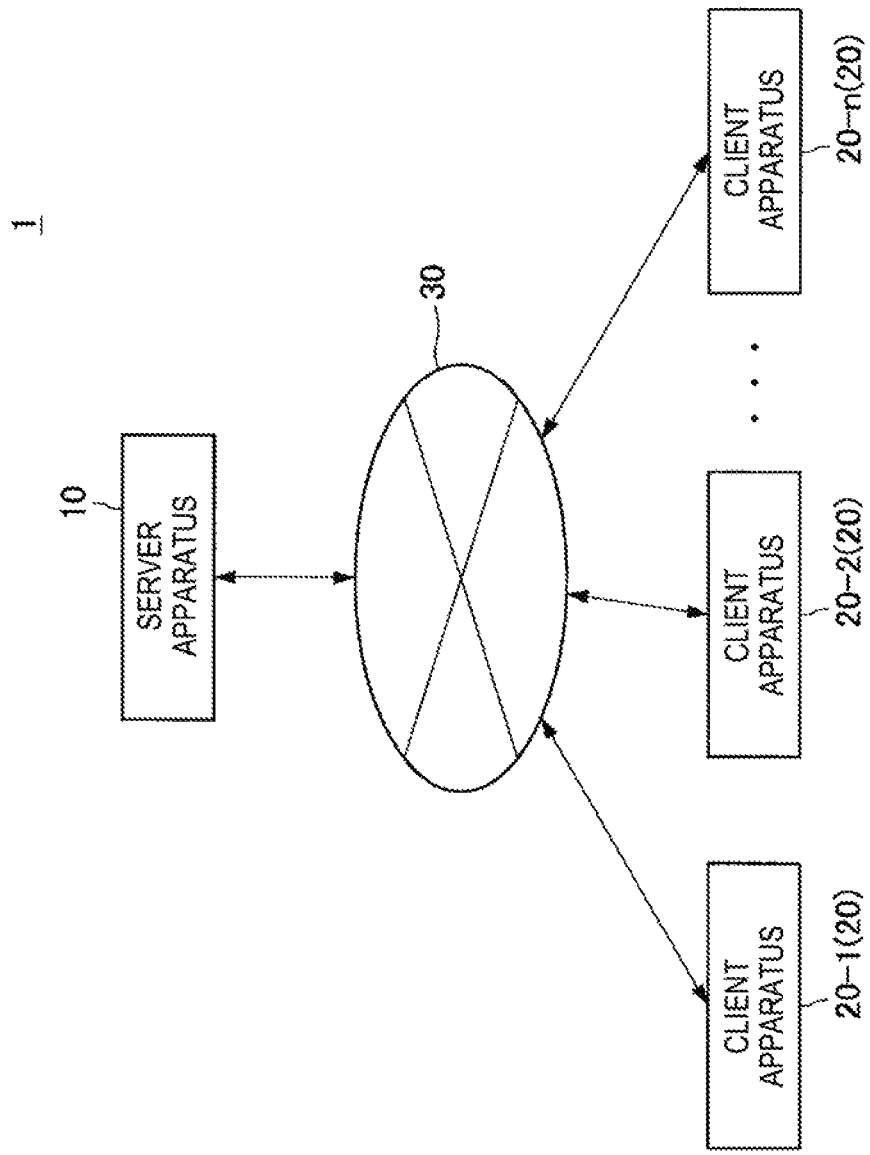
FIG. 1 shows a configuration example of an information processing system according to an embodiment of the present disclosure.

A configuration example of an information processing system 1 according to an embodiment of the present disclosure will be described. FIG. 1 shows a configuration example of the information processing system 1 according to the embodiment of the present disclosure. When referring to FIG. 1, the information processing system 1 includes a server apparatus 10 and client apparatuses 20-1 to 20-$n$ ($n$ is a natural number). The server apparatus 10 and the client apparatuses 20-1 to 20-$n$ can perform wired or wireless communication via a network 30.

Note that, in the following description, an example where the server apparatus 10 is applied to a personal computer (PC) will be described, but the server apparatus 10 may be applied to an apparatus other than a PC. For example, the server apparatus 10 may be applied to a smartphone, a video camera, a digital camera, a personal digital assistant (PDA), a mobile phone, a portable music playing device, a portable video processing device, or a portable game console.

Note that, in the following description, an example where the client apparatuses 20-1 to 20-$n$ are applied to PCs will be described, but the client apparatuses 20-1 to 20-$n$ may be applied to apparatuses other than PCs. For example, each of the client apparatuses 20-1 to 20-$n$ may be applied to a smartphone, a video camera, a digital camera, a PDA, a mobile phone, a portable music playing device, a portable video processing device, or a portable game console.

Heretofore, a configuration example of the information processing system 1 according to the embodiment of the present disclosure has been described.

2. FUNCTIONAL CONFIGURATION EXAMPLE OF SERVER APPARATUS

Figure 2:
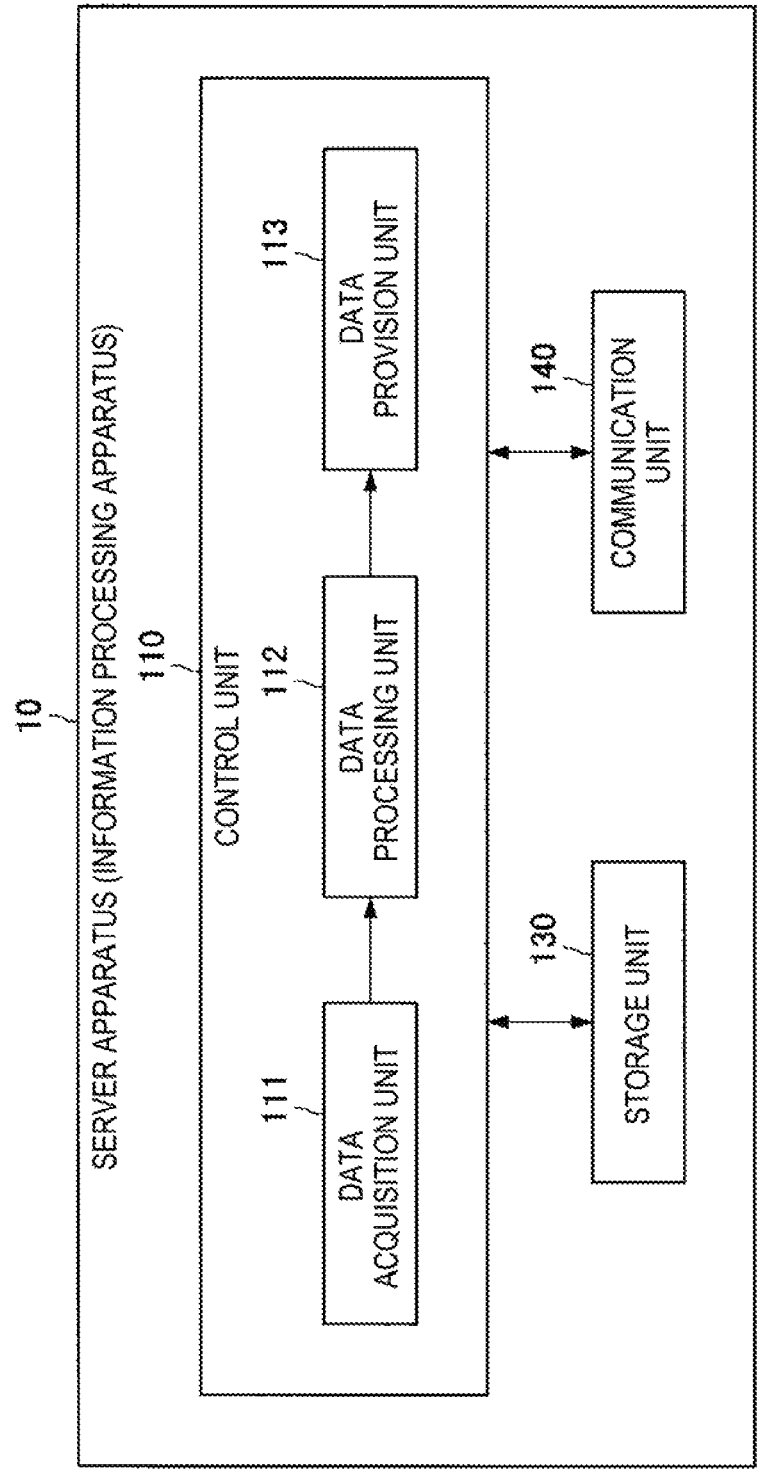
FIG. 2 shows a functional configuration example of a server apparatus according to this embodiment.

A functional configuration example of the server apparatus (information processing apparatus) 10 according to the embodiment of the present disclosure will be described. FIG. 2 shows a functional configuration example of the server apparatus 10 according to the embodiment of the present disclosure. As shown in FIG. 2, the server apparatus 10 includes a control unit 110, a storage unit 130, and a communication unit 140.

The control unit 110 corresponds to, for example, a processor such as a central processing unit (CPU). The control unit 110 executes programs stored in the storage unit 130 or another storage medium, thereby exhibiting various functions that the control unit 110 has. The control unit 110 includes functional blocks such as a data acquisition unit 111, a data processing unit 112, and a data provision unit 113. Functions that the functional blocks have will be described below.

The storage unit 130 stores programs for operating the control unit 110 by using a storage medium such as a semiconductor memory or a hard disk. The storage unit 130 can also store, for example, various kinds of data used by the programs. Note that, although the storage unit 130 is integrally provided with the server apparatus 10 in the example shown in FIG. 2, the storage unit 130 may be separately provided from the server apparatus 10.

The communication unit 140 can communicate with another apparatus (for example, client apparatuses 20). In the case where the communication unit 140 communicates with, for example, the client apparatuses 20, such communication can be performed via the network 30. A mode of the communication performed by the communication unit 140 is not particularly limited, and the communication performed by the communication unit 140 may be wireless communication or may be wired communication. Note that, although the communication unit 140 is integrally provided with the server apparatus 10 in the example shown in FIG. 2, the communication unit 140 may be separately provided from the server apparatus 10.

Heretofore, a functional configuration example of the server apparatus 10 according to the embodiment of the present disclosure has been described.

3. FUNCTIONAL CONFIGURATION EXAMPLE OF CLIENT APPARATUS

Figure 3:
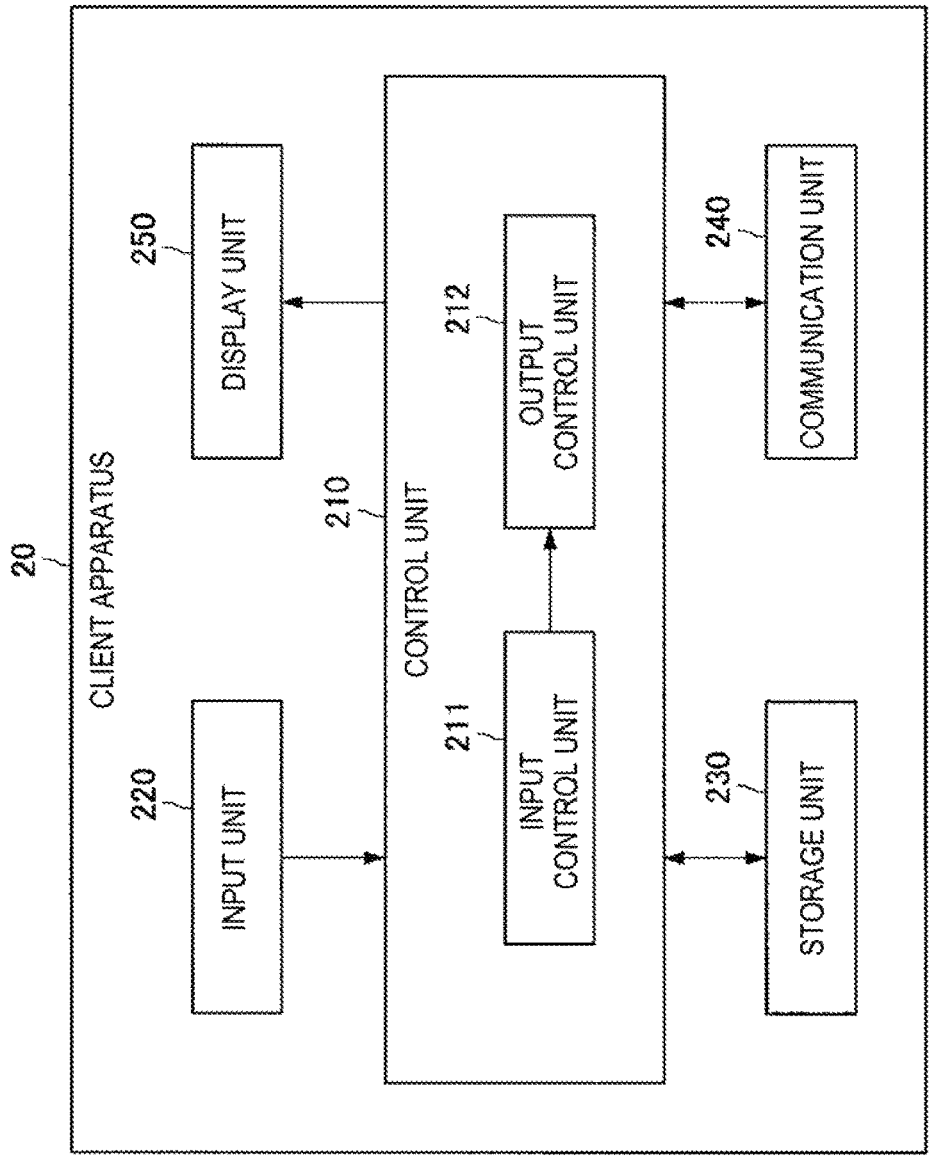
FIG. 3 shows a functional configuration example of a client apparatus according to this embodiment.

A functional configuration example of the client apparatus 20 according to the embodiment of the present disclosure will be described. FIG. 3 shows a functional configuration example of the client apparatus 20 according to the embodiment of the present disclosure. As shown in FIG. 3, the client apparatus 20 includes a control unit 210, an input unit 220, a storage unit 230, a communication unit 240, and a display unit 250.

The control unit 210 corresponds to, for example, a processor such as CPU. The control unit 210 executes programs stored in the storage unit 230 or another storage medium, thereby exhibiting various functions that the control unit 210 has. The control unit 210 includes functional blocks such as an input control unit 211 and an output control unit 212. Functions that the functional blocks have will be described below.

The input unit 220 detects user's operation and outputs the detected user's operation to the control unit 210. For example, in the case where the input unit 220 is made up of a touchscreen, user's operation can correspond to operation of tapping the touchscreen. However, the input unit 220 may be made up of hardware (for example, button) other than the touchscreen. Note that, although the input unit 220 is integrally provided with the client apparatus 20 in the example shown in FIG. 3, the input unit 220 may be may be separately provided from the client apparatus 20.

The storage unit 230 stores programs for operating the control unit 210 by using a storage medium such as a semiconductor memory or a hard disk. The storage unit 230 can also store, for example, various kinds of data used by the programs. Note that, although the storage unit 230 is integrally provided with the client apparatus 20 in the example shown in FIG. 3, the storage unit 230 may be separately provided from the client apparatus 20.

The communication unit 240 can communicate with another apparatus (for example, the server apparatus 10 or other client apparatuses 20). In the case where the communication unit 240 communicates with, for example, another apparatus, such communication can be performed via the network 30. A mode of the communication performed by the communication unit 240 is not particularly limited, and the communication performed by the communication unit 240 may be wireless communication or may be wired communication. Note that, although the communication unit 240 is integrally provided with the client apparatus 20 in the example shown in FIG. 3, the communication unit 240 may be separately provided from the client apparatus 20.

The display unit 250 displays various kinds of information in accordance with control performed by the control unit 210. The display unit 250 is made up of, for example, a liquid crystal display (LCD) or an organic electroluminescence (EL) display device. Note that, although the display unit 250 is integrally provided with the client apparatus 20 in the example shown in FIG. 3, the display unit 250 may be separately provided from the client apparatus 20. For example, a display device connected to the client apparatus 20 in a wired or wireless way may be treated as the display unit 250.

Heretofore, a functional configuration example of the client apparatus 20 according to the embodiment of the present disclosure has been described.

4. DETAILED FUNCTIONS OF INFORMATION PROCESSING SYSTEM

Detailed functions of the information processing system 1 according to the embodiment of the present disclosure will be described. The storage unit 130 in the server apparatus 10 stores one or a plurality of templates. The type of template is not particularly limited, and the template may be a 3C analysis template or may be a SWOT analysis template. Each of the one or plurality of templates include factors. The number and types of factors included in each of the one or plurality of templates are not particularly limited.

Figure 4:
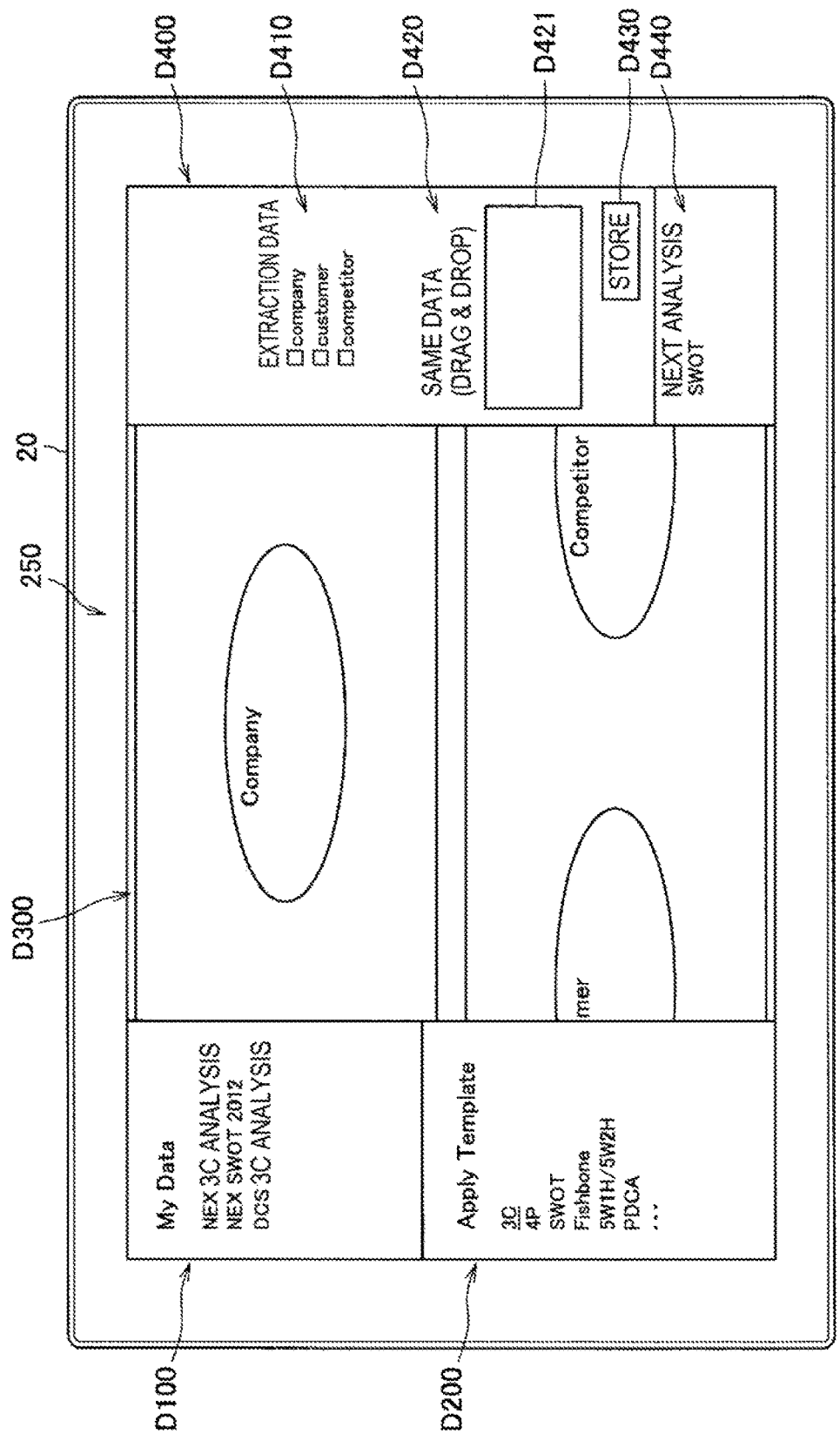
FIG. 4 shows a display example of a 3C analysis template.

FIG. 4 shows a display example of a 3C analysis template. As shown in FIG. 4, the output control unit 212 in the client apparatus 20 can display, on the display unit 250, a storage data selection screen D100, a template selection screen D200, a data generation screen D300, and an operation selection screen D400. Storage data is data generated by utilizing a template and stored by the storage unit 130 of the server apparatus 10. Therefore, it is also possible to generate another data by diverting storage data that has already been generated.

Identification information of the storage data included in the storage data selection screen D100 is stored by the storage unit 130 in the server apparatus 10, and the input control unit 211 in the client apparatus 20 can acquire the identification information of the storage data from the server apparatus 10. The storage data is also stored by the storage unit 130, and, when identification information of the storage data is selected by user's operation, the output control unit 212 can provide a selection request containing the selected identification information to the server apparatus 10 via the communication unit 240.

The data acquisition unit 111 in the server apparatus 10 can acquire the selection request from the client apparatus 20 via the communication unit 140. The data processing unit 112 can select storage data corresponding to the selection request (storage data corresponding to the identification information contained in the selection request) from the storage unit 130, and the data provision unit 113 can provide the selected storage data to the client apparatus 20 via the communication unit 140. The input control unit 211 in the client apparatus 20 can acquire the storage data via the communication unit 140. The output control unit 212 can display the acquired storage data on the data generation screen D300.

Identification information of the templates included in the template selection screen D200 is stored by the storage unit 130 in the server apparatus 10, and the input control unit 211 in the client apparatus 20 can acquire the identification information of the templates from the server apparatus 10. The templates are also stored by the storage unit 130, and, when identification information of a template is selected by user's operation, the output control unit 212 can provide a selection request containing the selected identification information to the server apparatus 10 via the communication unit 240.

The data acquisition unit 111 in the server apparatus 10 can acquire the selection request from the client apparatus 20 via the communication unit 140. The data processing unit 112 can select a template corresponding to the selection request (template corresponding to the identification information contained in the selection request) from the storage unit 130, and the data provision unit 113 can provide the selected template to the client apparatus 20 via the communication unit 140. The input control unit 211 in the client apparatus 20 can acquire the template via the communication unit 140. The output control unit 212 can display the acquired template on the data generation screen D300.

In the example shown in FIG. 4, the 3C analysis template is included in the data generation screen D300. Further, when referring to FIG. 4, the 3C analysis template includes three factors, i.e., Company, Customer, and Competitor. A user can generate data by using the data generation screen D300 displayed as described above. The operation selection screen D400 includes an extraction data selection section D410, a same data integration section D420, a same data input section D421, a storing operation button D430, and a transition destination template selection section D440. Those sections will be described below.

Note that, when a user performs predetermined operation for closing the storage data selection screen D100 and the template selection screen D200 (for example, operation of dragging the storage data selection screen D100 and the template selection screen D200 to outside), the output control unit 212 can close the storage data selection screen D100. Similarly, when a user performs predetermined operation for closing the operation selection screen D400 (for example, operation of dragging the operation selection screen D400 to outside), the output control unit 212 can close the operation selection screen D400.

Figure 5:
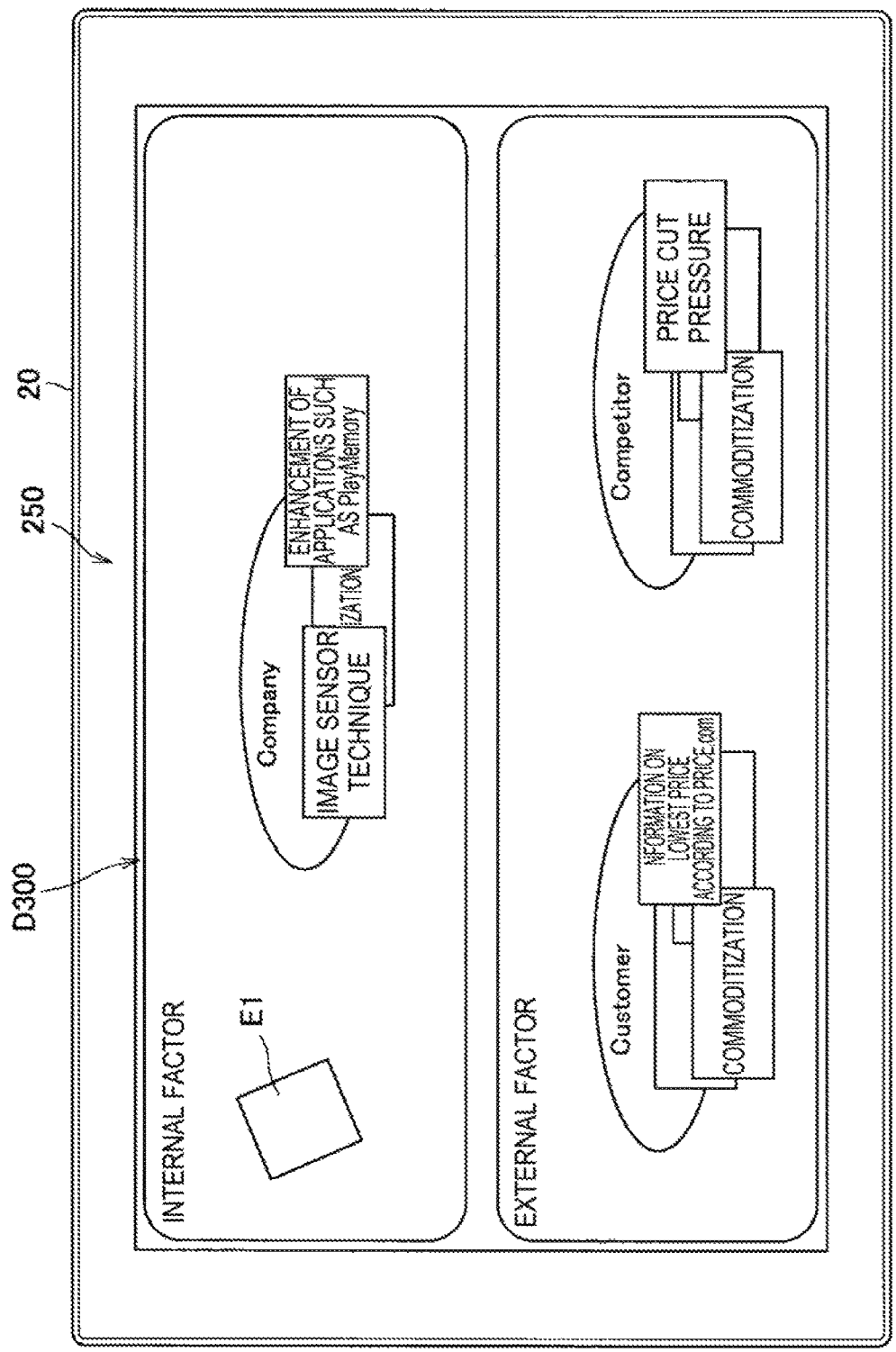
FIG. 5 shows a display example of a 3C analysis template displayed during data arrangement.

A user can generate data by arranging data on the data generation screen D300. FIG. 5 shows a display example of the 3C analysis template displayed during data arrangement. As shown in FIG. 5, Company is classified as "Internal factor", and Customer and Competitor are classified as "External factor". The output control unit 212 may display an object E1 for arranging data on the 3C analysis template.

When the object E1 is selected by user's operation, the output control unit 212 may display a region (a rectangular region in the example shown in FIG. 5) for allowing a user to arrange data. Then, when the user performs operation of writing data in the region and moves the region, the output control unit 212 may move the region in which the data has been written. In the example shown in FIG. 5, data "Image sensor technique", "Enhancement of applications such as PlayMemory", and "Homogenization" are arranged in the factor "Internal factor". Similarly, data "Information on lowest price according to price.com" and "Price cut pressure" are arranged in the factor "External factor".

When arrangement of the data is completed and the user performs predetermined operation for opening the operation selection screen D400 (for example, operation of dragging an edge of the data generation screen D300 to inside), the output control unit 212 can open the operation selection screen D400. FIG. 6 shows a display example of the 3C analysis template displayed after completion of the data arrangement. When the storing operation button D430 is selected by user's operation, the output control unit 212 can provide a data processing request containing positions of respective pieces of the data arranged on the 3C analysis template to the server apparatus 10 via the communication unit 240.

The data acquisition unit 111 in the server apparatus 10 can acquire the data processing request from the client apparatus 20 via the communication unit 140. In response to the data processing request, the data processing unit 112 can associate the data with the factors included in the 3C analysis template. More specifically, the data processing unit 112 can specify factors corresponding to the positions of the data arranged on the 3C analysis template and can associate the data with the specified factors. The data processing unit 112 can also store the data associated with the factors as storage data in the storage unit 130.

FIG. 7 shows examples of the data associated with the 3C analysis template and information related to the data. As shown in FIG. 7, the data processing unit 112 may store the data associated with the 3C analysis template and the information related to the data (data ID, identification information of template, selectable factor, color, factor) in the storage unit 130. In particular, the selectable factor indicates a factor that can be associated with data among the factors included in the 3C analysis template. The color may be determined in accordance with factors.

The data provision unit 113 may provide a response to the data processing request as a data processing response to the client apparatus 20 via the communication unit 140. For example, the data processing response may be a response indicating whether or not the storage data has been normally stored. Note that the extraction data selection section D410 includes the factors included in the 3C analysis template, and the factors can be selected by a user. When a factor is selected by user's operation, the output control unit 212 can provide a data extraction request containing the selected factor to the server apparatus 10 via the communication unit 240.

The data acquisition unit 111 in the server apparatus 10 can acquire the data extraction request from the client apparatus 20 via the communication unit 140. In response to the data extraction request, the data processing unit 112 can provide data associated with the factor included in the 3C analysis template to the client apparatus 20 via the communication unit 140. More specifically, the data processing unit 112 specifies a factor (factor contained in the data extraction request) on the basis of the data extraction request, and the data provision unit 113 can provide data associated with the specified factor to the client apparatus 20 via the communication unit 140.

The input control unit 211 in the client apparatus 20 can acquire the data via the communication unit 140. The output control unit 212 can display the acquired data on the data generation screen D300. For example, in the example shown in FIG. 6, when "Company" is selected from the extraction data selection section D410, the output control unit 212 can display the data "Image sensor technique", "Enhancement of applications such as PlayMemory", and "Homogenization" associated with "Company" on the data generation screen D300.

A plurality of pieces of the data associated with the 3C analysis template can be moved to the same data input section D421. When a plurality of pieces of the data are moved to the same data input section D421 by user's operation, the output control unit 212 can provide a data integration request containing IDs of the plurality of respective pieces of the data moved to the same data input section D421 to the server apparatus 10 via the communication unit 240.

The data acquisition unit 111 in the server apparatus 10 can acquire the data integration request from the client apparatus 20 via the communication unit 140. In response to the data integration request, the data processing unit 112 can integrate the plurality of pieces of the data. More specifically, the data processing unit 112 can specify the plurality of pieces of the data on the basis of the data integration request and can delete any one of the specified plurality of pieces of the data from the storage unit 130. For example, in the example shown in FIG. 6, when two pieces of data "Commoditization" are moved to the same data input section D421, the output control unit 212 can display the data generation screen D300 on which any one "Commoditization" has been deleted.

Identification information of a transition destination template included in the transition destination template selection section D440 is stored by the storage unit 130 in the server apparatus 10, and the input control unit 211 in client apparatus 20 can acquire the identification information of the transition destination template from the server apparatus 10. When the identification information of the transition destination template is selected by user's operation, the output control unit 212 can provide a switching request containing the selected identification information to the server apparatus 10 via the communication unit 240.

The data acquisition unit 111 in the server apparatus 10 can acquire the switching request from the client apparatus 20 via the communication unit 140. The data processing unit 112 can select a template corresponding to the switching request (template corresponding to the identification information contained in the switching request) from the storage unit 130, and the data provision unit 113 can provide the selected template to the client apparatus 20 via the communication unit 140. The data provision unit 113 may provide the selected template and data associated with the template to the client apparatus 20.

The input control unit 211 in the client apparatus 20 can acquire the template via the communication unit 140. The output control unit 212 can display the acquired template on the data generation screen D300. At this time, data generated by using a transition source template (first template) can be utilized to generate data with the use of a transition destination template (second template).

More specifically, in the case where factors included in the transition source template and factors included in the transition destination template corresponding to the switching request from the client apparatus 20 are common, the data processing unit 112 can associate data associated with the factors included in the transition source template with the factors included in the transition destination template. This allows a user to save time and effort required for generating data on the basis of the transition destination template with the use of the data that has already been generated on the basis of the transition source template.

For example, the case where the transition source template is the 3C analysis template and the SWOT analysis template is selected from the transition destination template selection section D440 is considered. FIG. 8 shows a display example of the SWOT analysis template obtained by utilizing data associated with the 3C analysis template. In the example shown in FIG. 8, S (strengths) and W (weaknesses) are classified as "Internal factor", and O (opportunities) and T (threats) are classified as "External factor". Further, S (strengths) and O (opportunities) are classified as "Positive influence", and W (weaknesses) and T (threats) are classified as "Negative influence". The output control unit 212 may display the object E1 for arranging data on the SWOT analysis template.

Herein, when referring to FIG. 6 and FIG. 8, "Internal factor" and "External factor" are common in the factors included in the 3C analysis template and the factors included in the SWOT analysis template. In view of this, the data processing unit 112 may associate the data "Image sensor technique", "Enhancement of applications such as PlayMemory", and "Homogenization" associated with the factor "Internal factor" included in the 3C analysis template with the factor "Internal factor" included in the SWOT analysis template. Similarly, the data processing unit 112 may associate the data "Information on lowest price according to price.com" and "Price cut pressure" associated with the factor "External factor" included in the SWOT analysis template with the factor "External factor" included in the SWOT analysis template.

FIG. 9 shows examples of the data associated with the SWOT analysis template and information (initial values) related to the data. As shown in FIG. 9, the data processing unit 112 may store the data associated with the SWOT analysis template and the information related to the data (data ID, identification information of template, selectable factor, color, factor) in the storage unit 130. As shown in FIG. 9, initial values of the color and the factor may be "Default" or may be another values.

Figure 10:
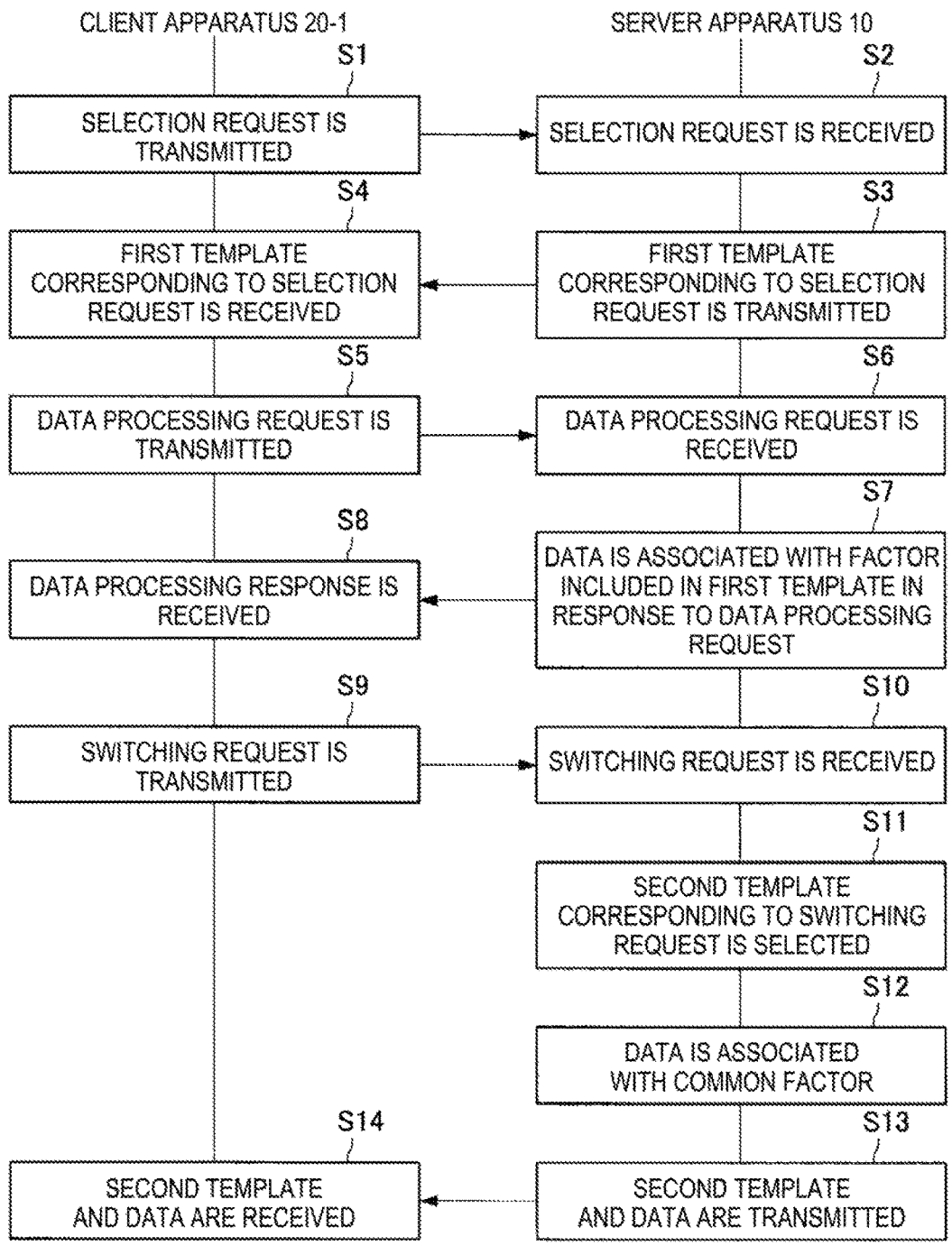
FIG. 10 is a flowchart showing an example of a flow of operation of an information processing system.

A flow of operation of the information processing system 1 will be described. FIG. 10 is a flowchart showing an example of the flow of the operation of the information processing system 1 according to the embodiment of the present disclosure. Note that, although FIG. 10 shows an example of a flow of operation of the server apparatus 10 and the client apparatus 20-1, the server apparatus 10 and the client apparatuses 20-2 to 20-n may also be operated similarly. Further, the example shown in FIG. 10 is merely an example of the flow of the operation of the server apparatus 10 and the client apparatus 20-1, and therefore the flow of the operation of the server apparatus 10 and the client apparatus 20-1 is not limited to the example shown in FIG. 10.

First, as shown in FIG. 10, the client apparatus 20-1 transmits a selection request for selecting a first template (transition source template) to the server apparatus 10 (Step S1). The server apparatus 10 receives the selection request transmitted from the client apparatus 20-1 (Step S2). Then, the server apparatus 10 selects the first template (transition source template) corresponding to the received selection request and transmits the selected first template (transition source template) to the client apparatus 20-1 (Step S3).

Then, the client apparatus 20-1 receives the first template (transition source template) corresponding to the selection request (Step S4) and arranges data on the first template (transition source template). When arrangement of the data on the first template (transition source template) is completed, the client apparatus 20-1 transmits a data processing request to the server apparatus 10 (Step S5). The server apparatus 10 receives the data processing request transmitted from the client apparatus 20-1 (Step S6).

Then, the server apparatus 10 associates the data with factors included in the first template (transition source template) in response to the data processing request (Step S7). When association of the data is completed, the server apparatus 10 may transmit a data processing response to the client apparatus 20-1 as a response to the data processing request, and the client apparatus 20-1 may receive the data processing response from the server apparatus 10 (Step S8).

Then, the client apparatus 20-1 transmits a switching request for switching the template with a second template (transition destination template) to the server apparatus 10 (Step S9). The server apparatus 10 receives the switching request transmitted from the client apparatus 20-1 (Step S10). Then, the server apparatus 10 selects the second template (transition destination template) corresponding to the received switching request.

Then, in the case where a factor included in the second template (transition destination template) and the factor included in the first template (transition source template) are common, the server apparatus 10 associates data associated with the factor included in the first template (transition source template) with the factor included in the second template (transition destination template) (Step S12). The server apparatus 10 transmits the second template (transition destination template) and the data to the client apparatus 20-1 (Step S3).

Then, the client apparatus 20-1 receives the second template (transition destination template) and the data from the server apparatus 10 (Step S14). The second template (transition destination template) received by the client apparatus 20-1 is associated with the data. This allows a user to save time and effort required for generating data on the basis of the second template (transition destination template) with the use of the data that has already been generated on the basis of the first template (transition source template).

Heretofore, the flow of the operation of the information processing system 1 has been described. Also in the case where a SWOT analysis template is displayed on the data generation screen D300, when arrangement of data is completed and the storing operation button is selected by user's operation, the output control unit 212 can provide a data processing request containing positions of respective pieces of the data arranged on the SWOT analysis template to the server apparatus 10 via the communication unit 240.

The data acquisition unit 111 in the server apparatus 10 can acquire the data processing request from the client apparatus 20 via the communication unit 140. In response to the data processing request, the data processing unit 112 can associate the data with factors included in the SWOT analysis template. More specifically, the data processing unit 112 can specify factors corresponding to the positions of the data arranged on the SWOT analysis template and can associate the data with the specified factors.

FIG. 11 shows examples of the data associated with the SWOT analysis template and information (definitive values) related to the data. As shown in FIG. 11, the data processing unit 112 may store the data associated with the SWOT analysis template and the information related to the data (data ID, identification information of template, selectable factor, color, factor) in the storage unit 130. As shown in FIG. 11, the data processing unit 112 may determine the color and the factor.

Note that not all the data associated with the transition source template needs to be utilized in the transition destination template. For example, data extracted from the data associated with the transition source template may be utilized in the transition destination template. Therefore, for example, in the case where a switching request contains a factor included in the transition source template, the data provision unit 113 may associate data associated with the factor with a factor included in the transition destination template.

Figure 12:
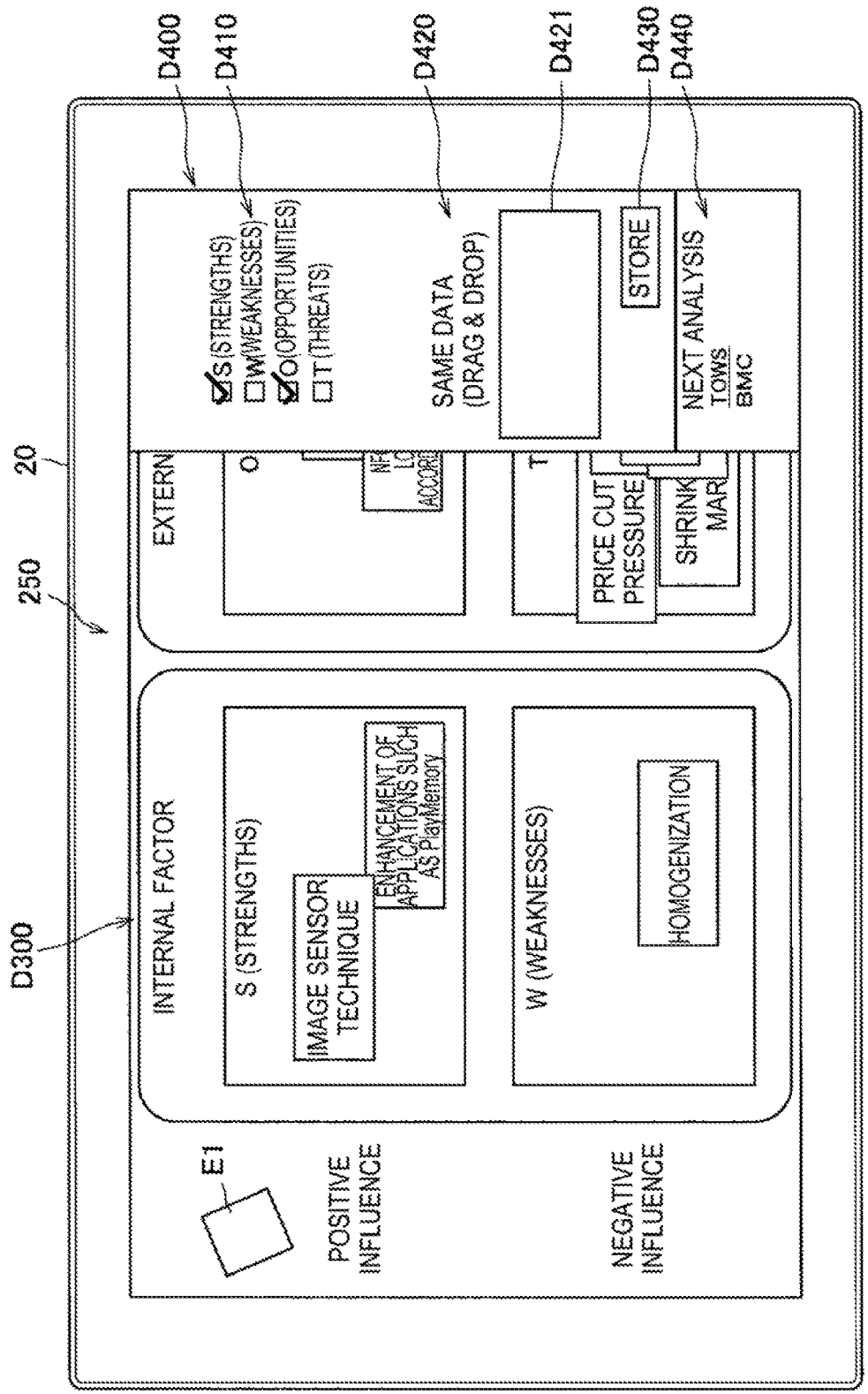
FIG. 12 shows an example where data to be utilized for the next template is extracted from data associated with a SWOT analysis template.

FIG. 12 shows an example where data to be utilized for the next template is extracted from the data associated with the SWOT analysis template. The extraction data selection section D410 includes the factors included in the SWOT analysis template, and the factors can be selected by a user. When a factor is selected by user's operation, the output control unit 212 can provide a switching request containing the selected factor to the server apparatus 10 via the communication unit 240.

The data acquisition unit 111 in the server apparatus 10 can acquire the switching request from the client apparatus 20 via the communication unit 140. In response to the switching request, the data processing unit 112 can provide data associated with the factor included in the SWOT analysis template to the client apparatus 20 via the communication unit 140. More specifically, the data processing unit 112 can specify a factor (factor contained in the switching request) on the basis of the switching request, and the data provision unit 113 can provide data associated with the specified factor to the client apparatus 20 via the communication unit 140.

The input control unit 211 in the client apparatus 20 can acquire the data via the communication unit 140. The output control unit 212 can display the acquired data on the data generation screen D300. For example, in the example shown in FIG. 12, when "S (strengths)" and "O (opportunities)" are selected from the extraction data selection section D410, the output control unit 212 can display the data "Image sensor technique" and "Enhancement of applications such as PlayMemory" associated with "S (strengths)" and the data "Information on lowest price according to price.com" associated with "O (opportunities)" on the data generation screen D300.

Figure 13:
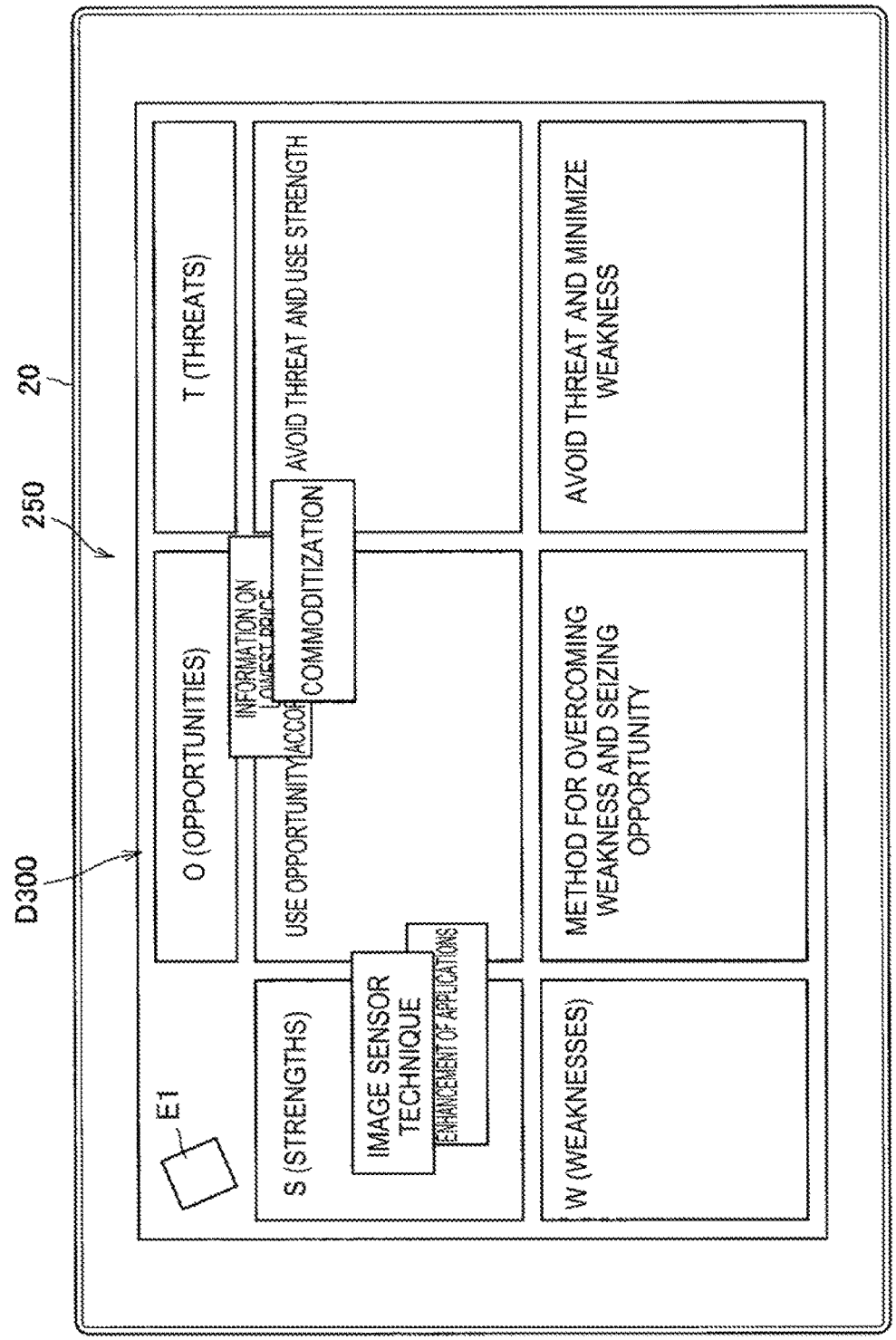
FIG. 13 shows a display example of a TOWS analysis template obtained by utilizing data associated with a SWOT analysis template.

For example, the case where a TOWS analysis template is selected from the transition destination template selection section D440 is considered. FIG. 13 shows a display example of the TOWS analysis template obtained by utilizing the data associated with the SWOT analysis template. In the example shown in FIG. 13, the data "Image sensor technique" and "Enhancement of applications such as PlayMemory" are associated with "S (strengths)", and the data "Information on lowest price according to price.com" is associated with "O (opportunities)".

Figure 14:
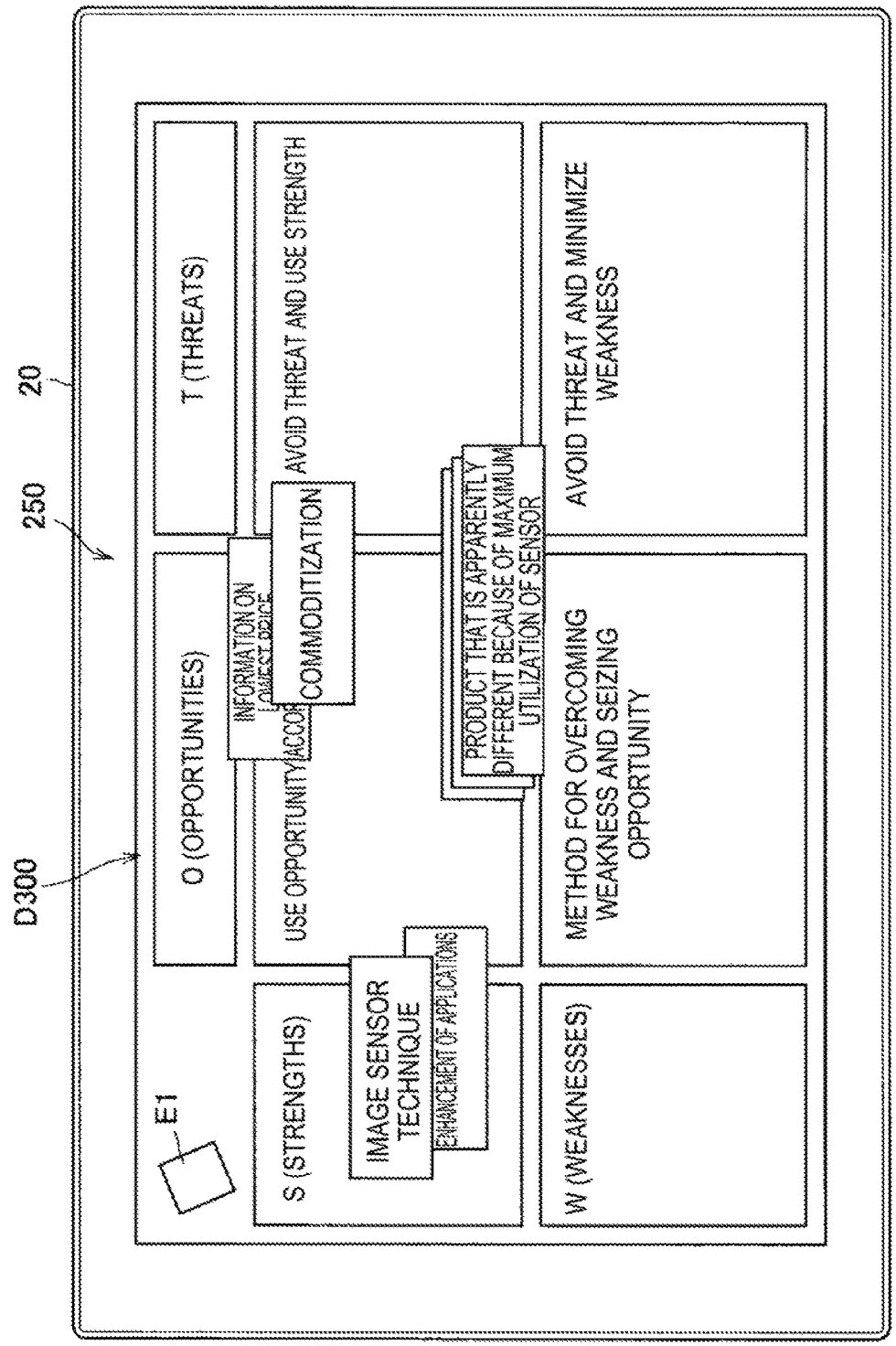
FIG. 14 shows a display example of a TOWS analysis template displayed during data arrangement.

When the object E1 is selected by user's operation, the output control unit 212 may display a region for allowing a user to arrange data. Then, when the user performs operation of writing data in the region and moves the region, the output control unit 212 may move the region in which the data has been written. FIG. 14 shows a display example of the TOWS analysis template displayed during data arrangement. In the example shown in FIG. 14, data "Product that is apparently different because of maximum utilization of sensor" is arranged on "S (strengths)" and "O (opportunities)" of the TOWS analysis template.

Figure 15:
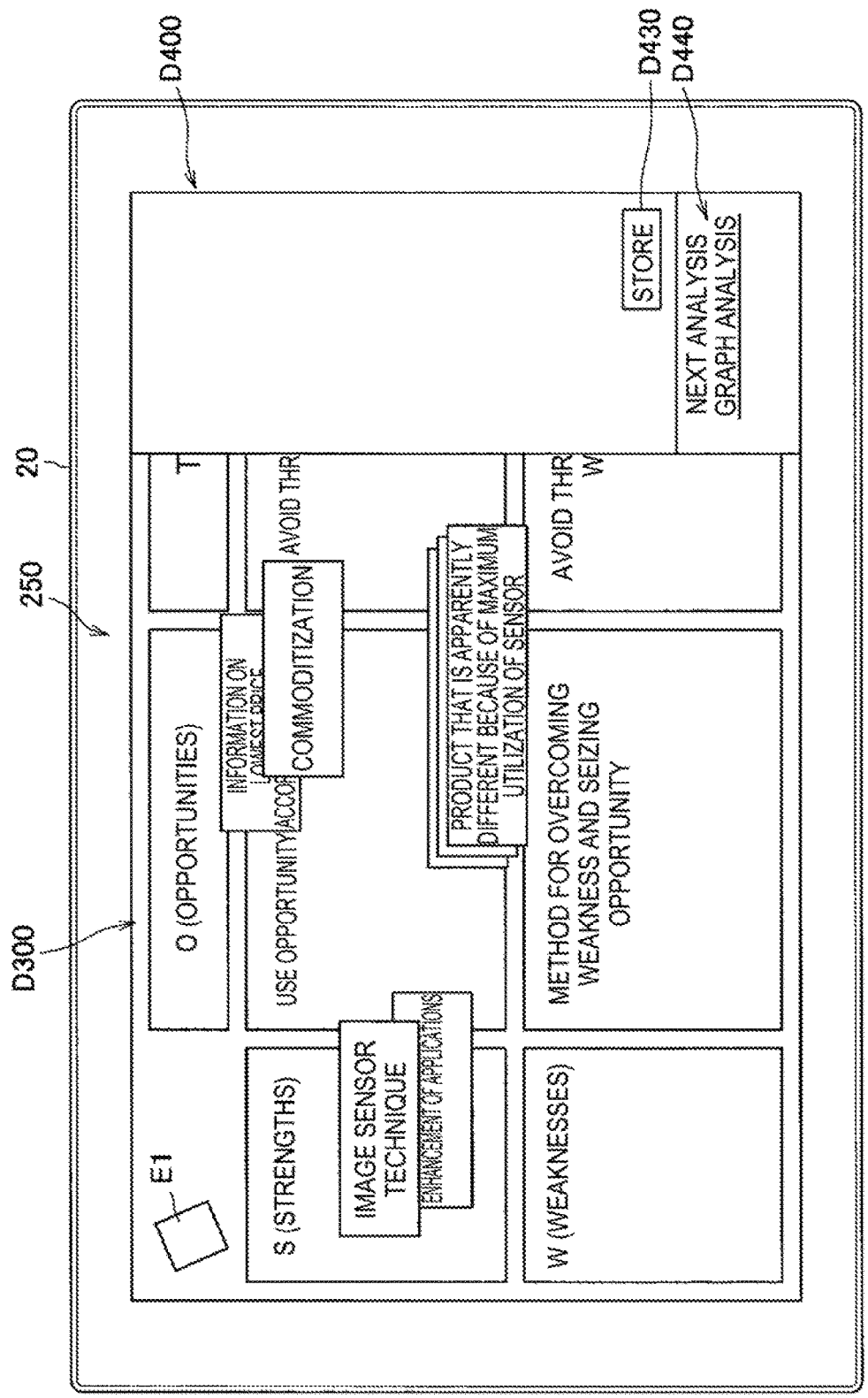
FIG. 15 shows a display example of a TOWS analysis template displayed after completion of data arrangement.

When arrangement of the data is completed and the user performs predetermined operation for opening the operation selection screen D400, the output control unit 212 can open the operation selection screen D400. FIG. 15 shows a display example of the TOWS analysis template displayed after completion of the data arrangement. When the storing operation button D430 is selected by user's operation, the output control unit 212 can provide a data processing request containing positions of respective pieces of the data arranged on the TOWS analysis template to the server apparatus 10 via the communication unit 240.

The data acquisition unit 111 in the server apparatus 10 can acquire the data processing request from the client apparatus 20 via the communication unit 140. In response to the data processing request, the data processing unit 112 can associate the data with the TOWS analysis template. The data processing unit 112 can also store the data associated with the TOWS analysis template as storage data in the storage unit 130.

Figure 16:
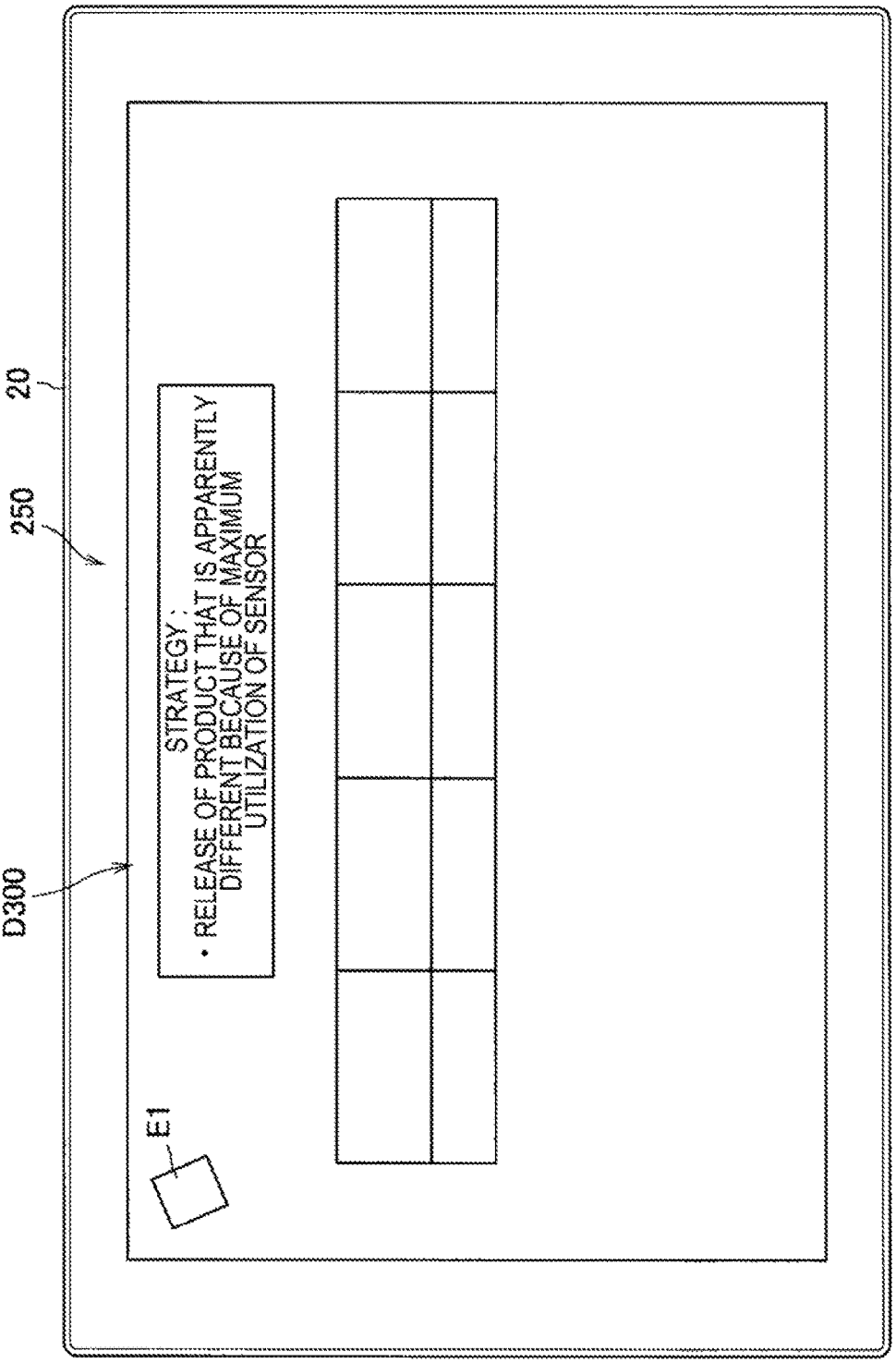
FIG. 16 shows a display example of a graph analysis template obtained by utilizing data associated with a TOWS analysis template.

For example, the case where a graph analysis template is selected from the transition destination template selection section D440 is considered. FIG. 16 shows a display example of the graph analysis template obtained by utilizing the data associated with the TOWS analysis template. As shown in FIG. 15, the TOWS analysis template is associated with the data "Product that is apparently different because of maximum utilization of sensor". In view of this, as shown in FIG. 16, the data processing unit 112 may associate the data "Product that is apparently different because of maximum utilization of sensor" associated with the TOWS analysis template with the graph analysis template. Information can be input to a sheet of the graph analysis template.

Figure 17:
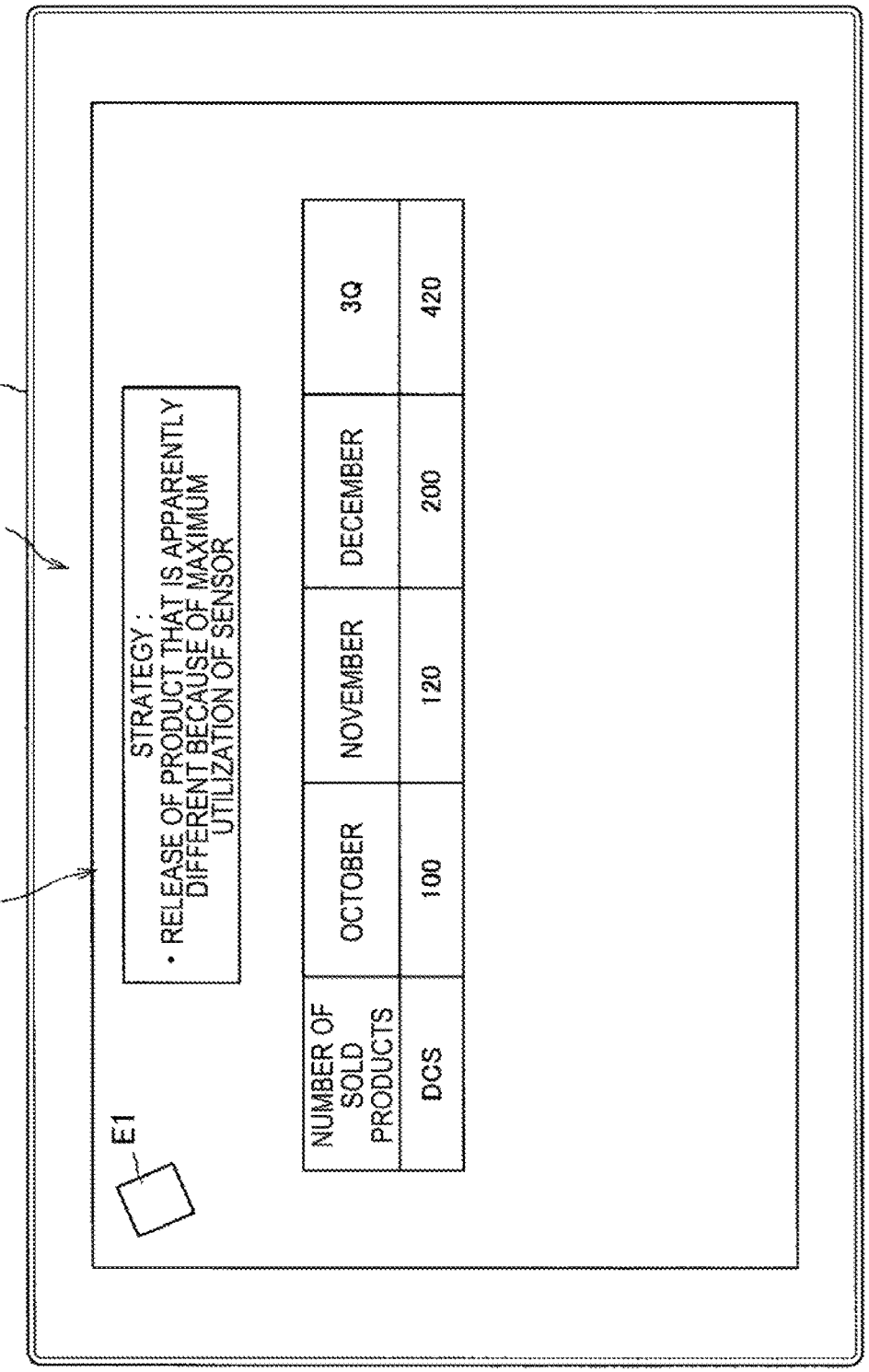
FIG. 17 shows a display example of a graph analysis template displayed during input of information.
Figure 18:
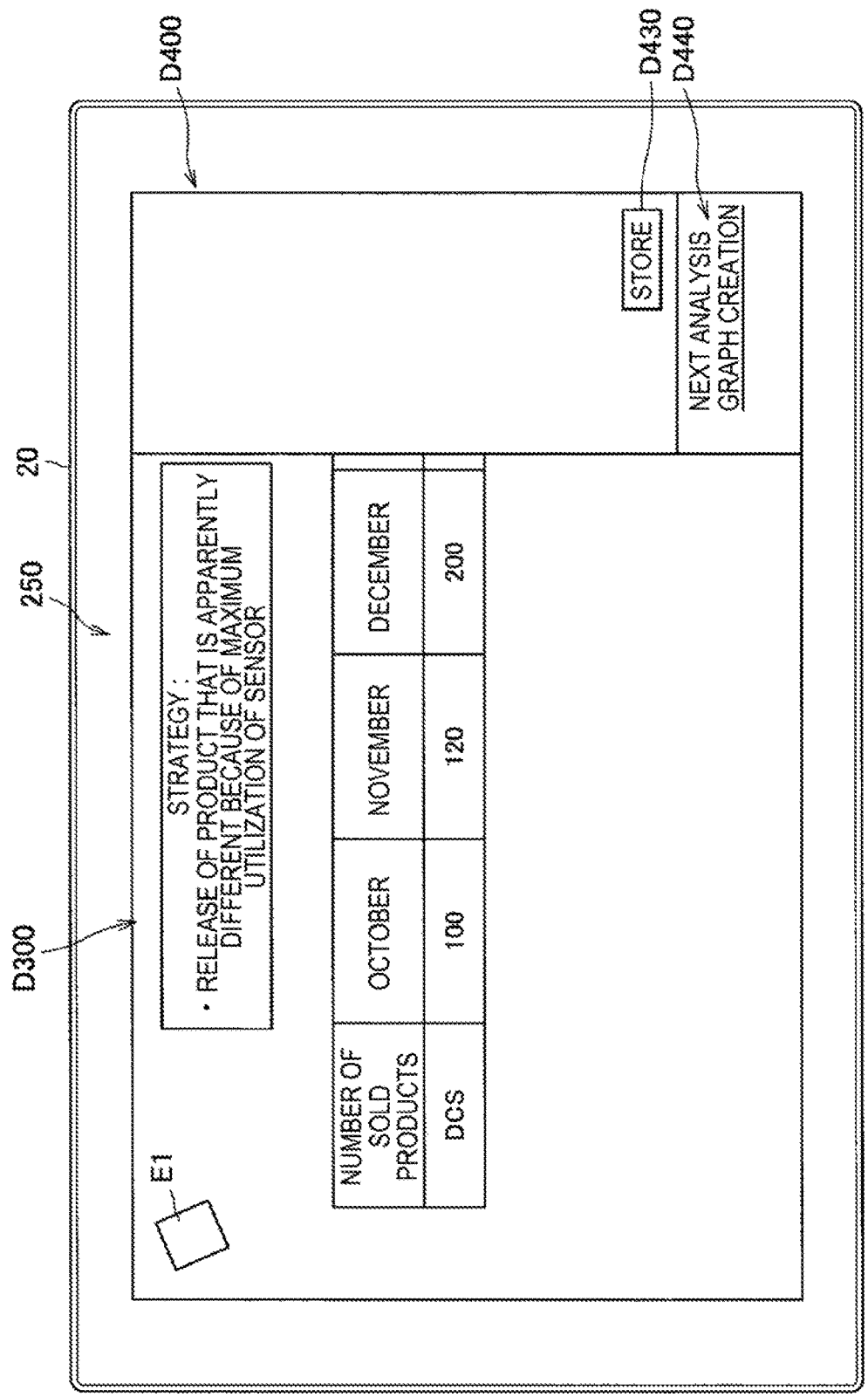
FIG. 18 shows a display example of a graph analysis template displayed after completion of data arrangement.

FIG. 17 shows a display example of the graph analysis template displayed during input of information. As shown in FIG. 17, when information is input by user's operation and, after input of the information is completed, a user performs predetermined operation for opening the operation selection screen D400, the output control unit 212 can open the operation selection screen D400. FIG. 18 shows a display example of the graph analysis template displayed after the input of the information. When the storing operation button D430 is selected by user's operation, the output control unit 212 can provide a data processing request containing the information input to the graph analysis template to the server apparatus 10 via the communication unit 240.

The data acquisition unit 111 in the server apparatus 10 can acquire the data processing request from the client apparatus 20 via the communication unit 140. In response to the data processing request, the data processing unit 112 can associate the information input to the sheet of the graph analysis template with the graph analysis template. The data processing unit 112 can also store the information associated with the graph analysis template as storage data in the storage unit 130.

Figure 19:
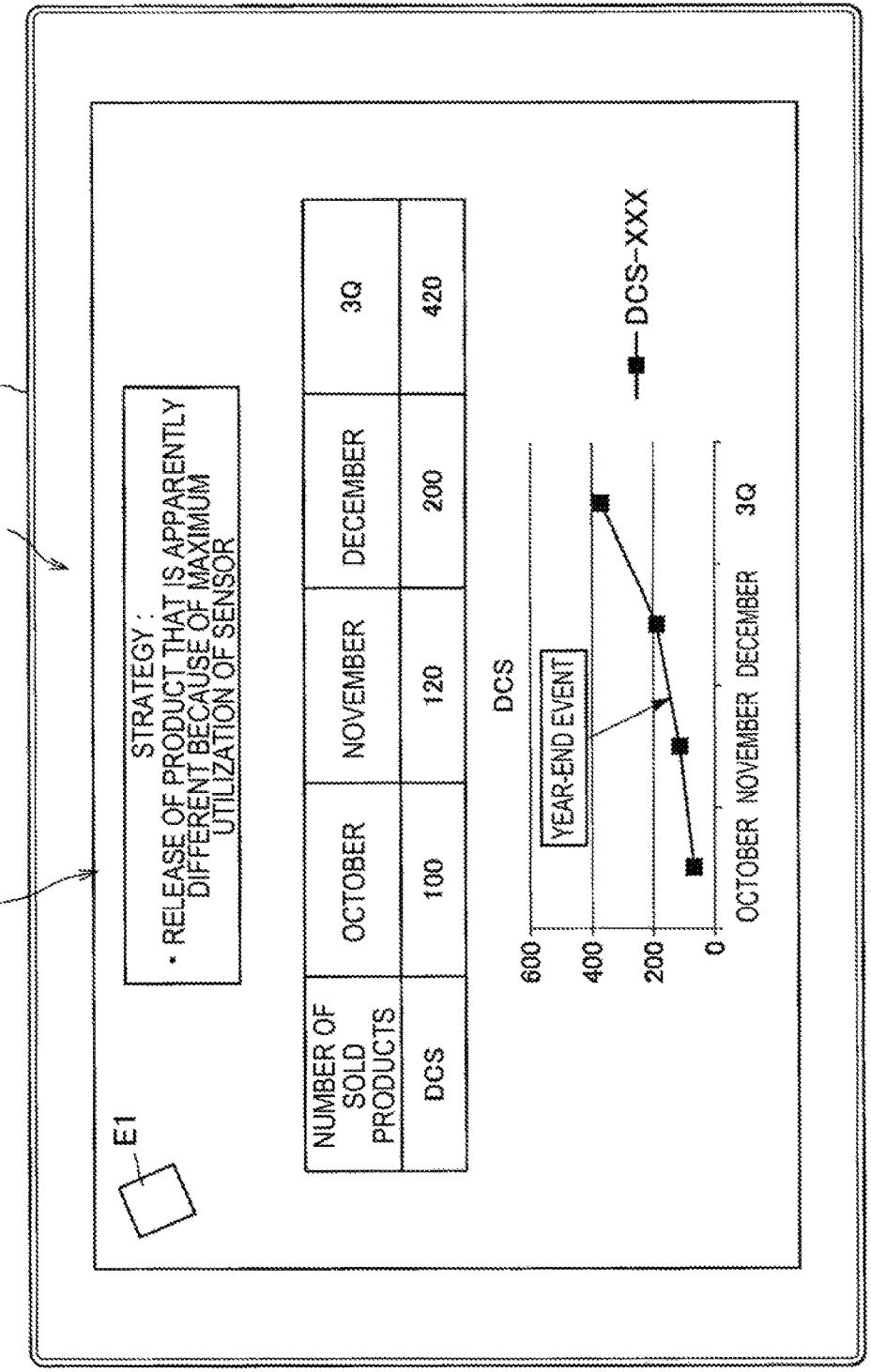
FIG. 19 shows a display example of a graph creation template obtained by utilizing data associated with a graph analysis template.

For example, the case where a graph creation template is selected from the transition destination template selection section D440 is considered. FIG. 19 shows a display example of the graph creation template obtained by utilizing the data associated with the graph analysis template. As shown in FIG. 18, the data "Product that is apparently different because of maximum utilization of sensor" is associated with the graph analysis template. In view of this, as shown in FIG. 19, the data processing unit 112 may associate the data "Product that is apparently different because of maximum utilization of sensor" associated with the graph creation template with the graph creation template.

As shown in FIG. 18, the information input to the sheet is associated with the graph analysis template. In view of this, as shown in FIG. 19, the data processing unit 112 may associate the information input to the sheet associated with the graph analysis template with the graph creation template. As shown in FIG. 19, the data processing unit 112 may create a graph on the basis of the information input to the sheet and may associate the created graph with the graph creation template. Further, the output control unit 212 may display the object E1 for arranging data on the graph creation template.

When the object E1 is selected by user's operation, the output control unit 212 may display a region for allowing a user to arrange data. Then, when the user performs operation of writing data in the region and moves the region, the output control unit 212 may move the region in which the data has been written. In the example shown in FIG. 19, data "Year-end event" is arranged on the graph. A leader line of the data "Year-end event" can be appropriately moved by user's operation.

Figure 20:
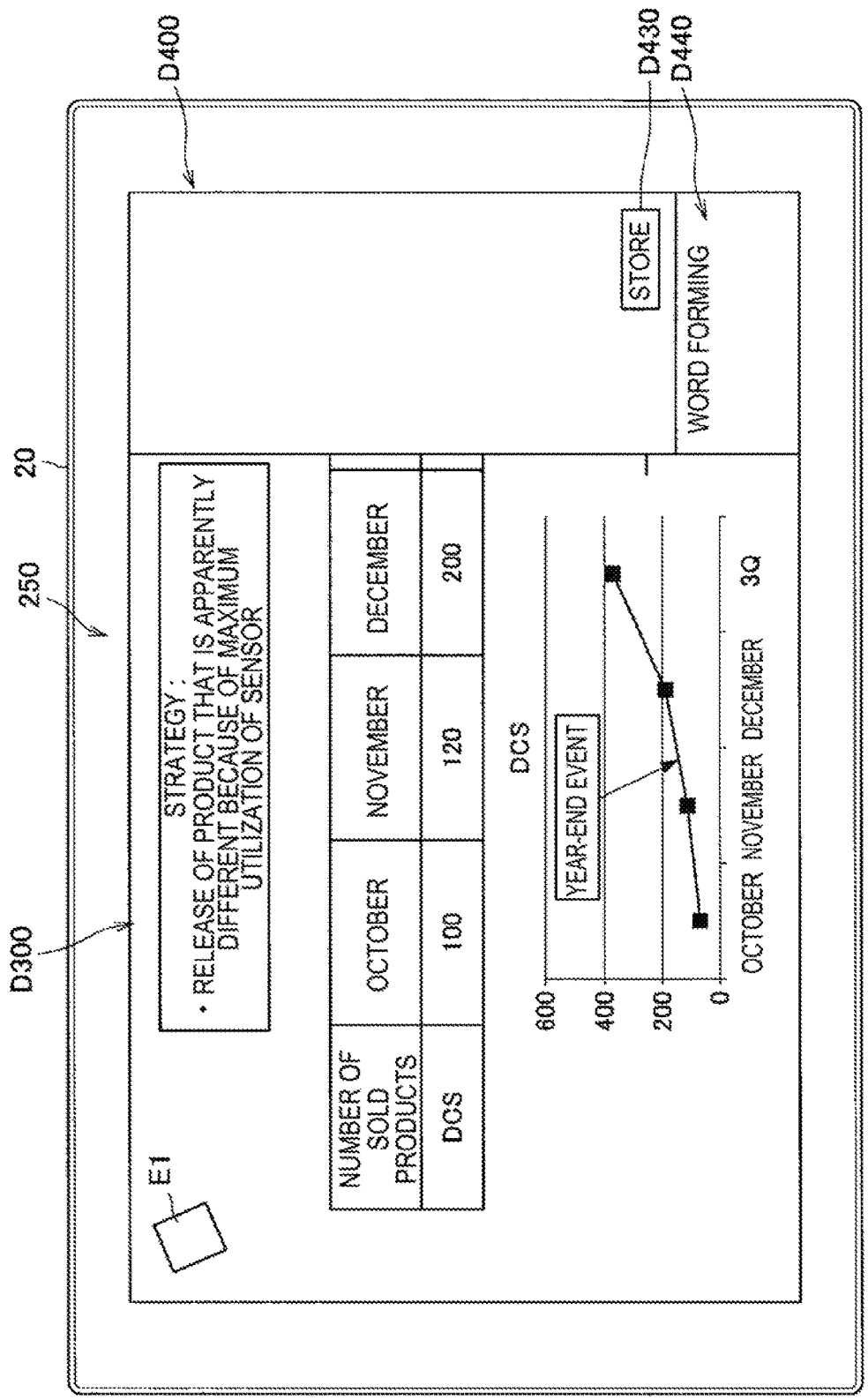
FIG. 20 shows a display example of a graph creation template displayed after completion of data arrangement.

When arrangement of the data is completed and the user performs predetermined operation for opening the operation selection screen D400, the output control unit 212 can open the operation selection screen D400. FIG. 20 shows a display example of the graph creation template displayed after completion of the data arrangement. When the storing operation button D430 is selected by user's operation, the output control unit 212 can provide a data processing request containing positions of pieces of the data arranged on the graph creation template to the server apparatus 10 via the communication unit 240.

The data acquisition unit 111 in the server apparatus 10 can acquire the data processing request from the client apparatus 20 via the communication unit 140. In response to the data processing request, the data processing unit 112 can associate the data with the graph creation template. More specifically, the data processing unit 112 can associate the data arranged on the graph creation template with the graph creation template. The data processing unit 112 can also store the data associated with the graph creation template as storage data in the storage unit 130.

Figure 21:
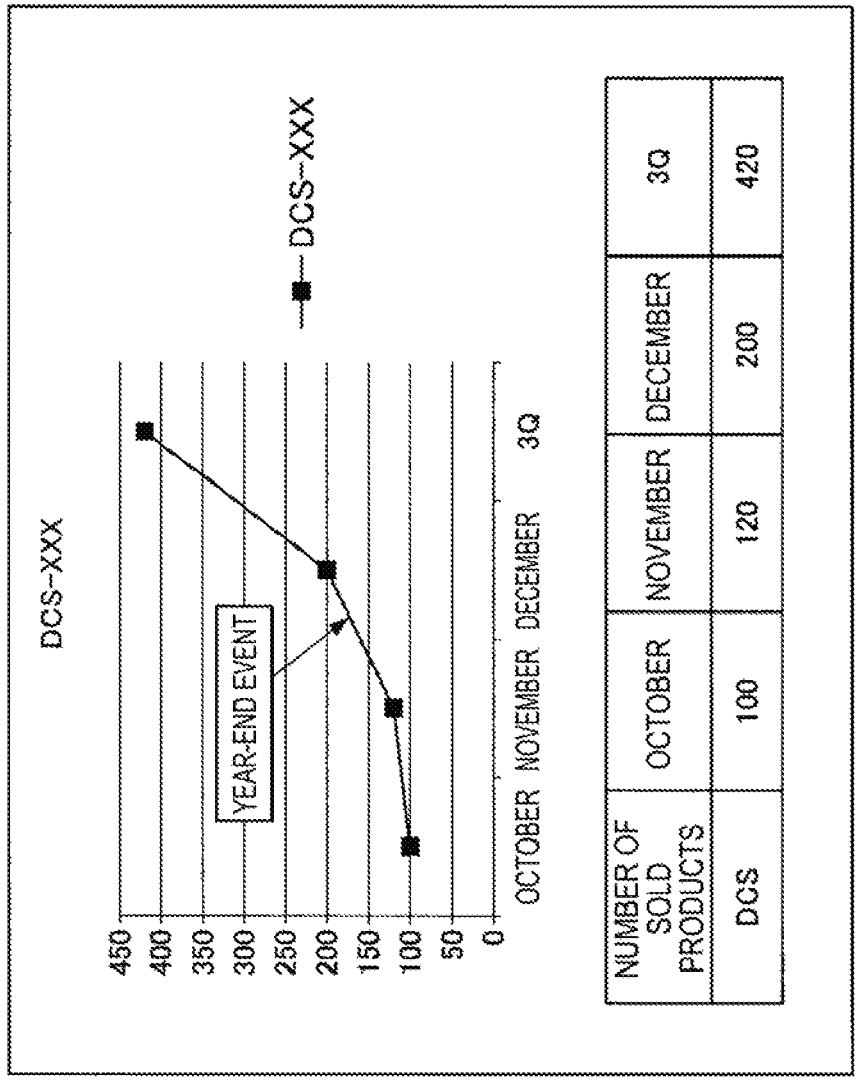
FIG. 21 shows a display example of a report created on the basis of data associated with a graph creation template.

For example, the case where a word forming template is selected from the transition destination template selection section D440 is considered. FIG. 21 shows a display example of a report created on the basis of the data associated with the graph creation template. In the example shown in FIG. 21, various kinds of data associated with the graph creation template (data "Product that is apparently different because of maximum utilization of sensor", sheet, graph, data "Year-end event", and the like) are displayed by the output control unit 212. The created report is not limited to this example.

Figure 22:
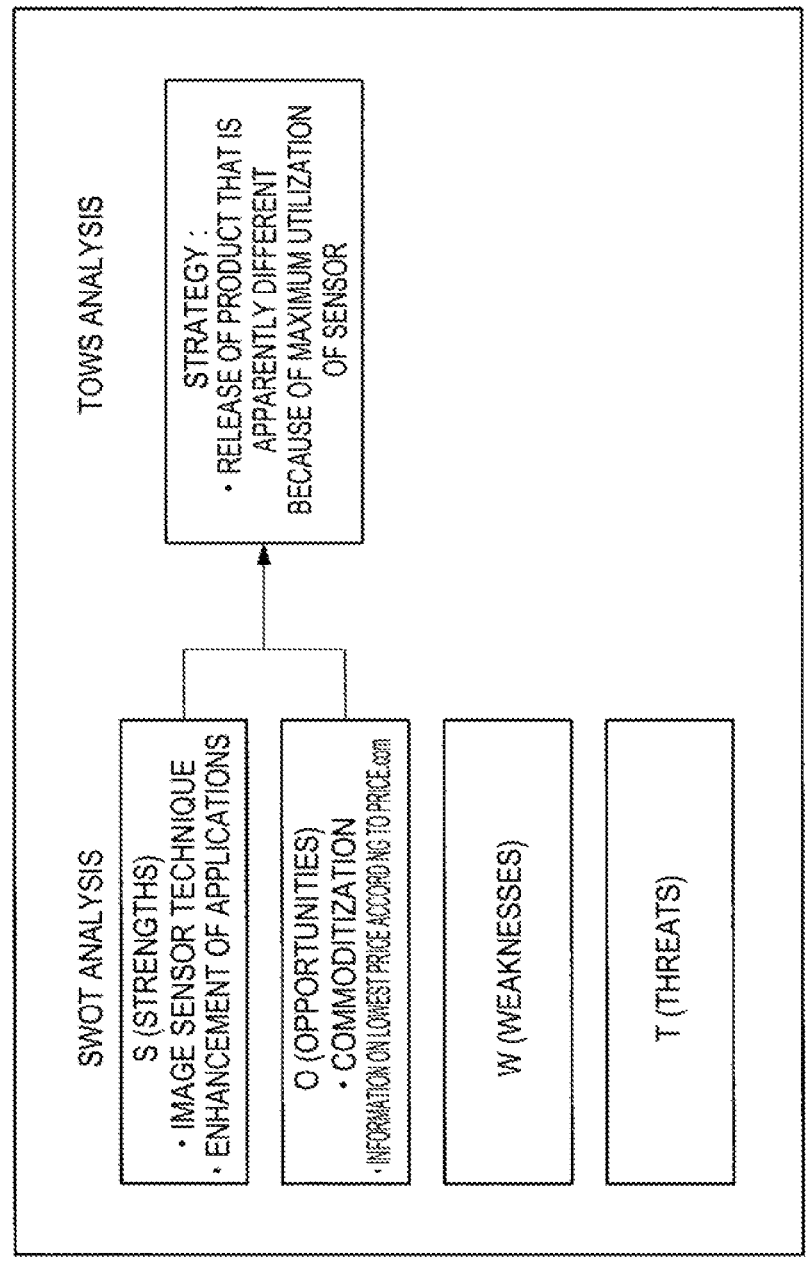
FIG. 22 shows the relation between SWOT analysis and TOWS analysis.

FIG. 22 shows the relation between SWOT analysis and TOWS analysis. As in the example shown in FIG. 22, the data processing unit 112 can provide, to the client apparatus 20 via the communication unit 140, information indicating the relation between the data associated with "S (strengths)" in the SWOT analysis (for example, "Image sensor technique" and "Enhancement in applications") and the data associated with "O (opportunities)" in the SWOT analysis (for example, "Commoditization" and "Information on lowest price according to price.com") and the data "Product that is apparently different because of maximum utilization of sensor" associated with "S (strengths)" and "O (opportunities)" in the TOWS analysis. Further, the output control unit 212 can display the information indicating the relation.

Figure 23:
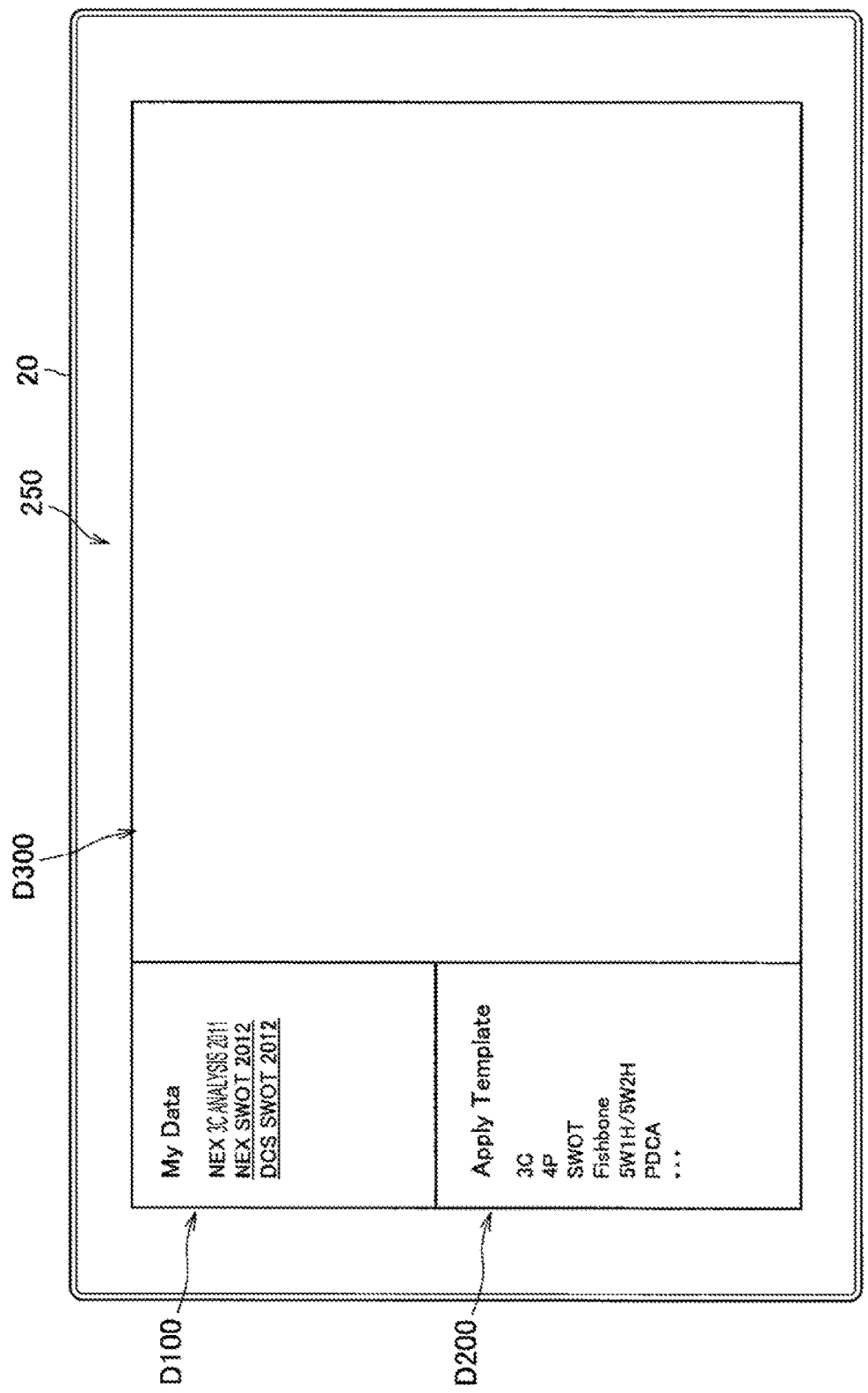
FIG. 23 shows a display example of a storage data selection screen.

In the case where a plurality of pieces of storage data are selected as targets to be merged, the data processing unit 112 may merge the plurality of pieces of the storage data. FIG. 23 shows a display example of the storage data selection screen. As shown in FIG. 23, the output control unit 212 in the client apparatus 20 can display the storage data selection screen D100, the template selection screen D200, and the data generation screen D300 on the display unit 250. Herein, when identification information of a plurality of pieces of the storage data are selected by user's operation, the output control unit 212 can provide a merge request containing the identification information of the selected plurality of pieces of the storage data to the server apparatus 10 via the communication unit 240.

Figure 24:
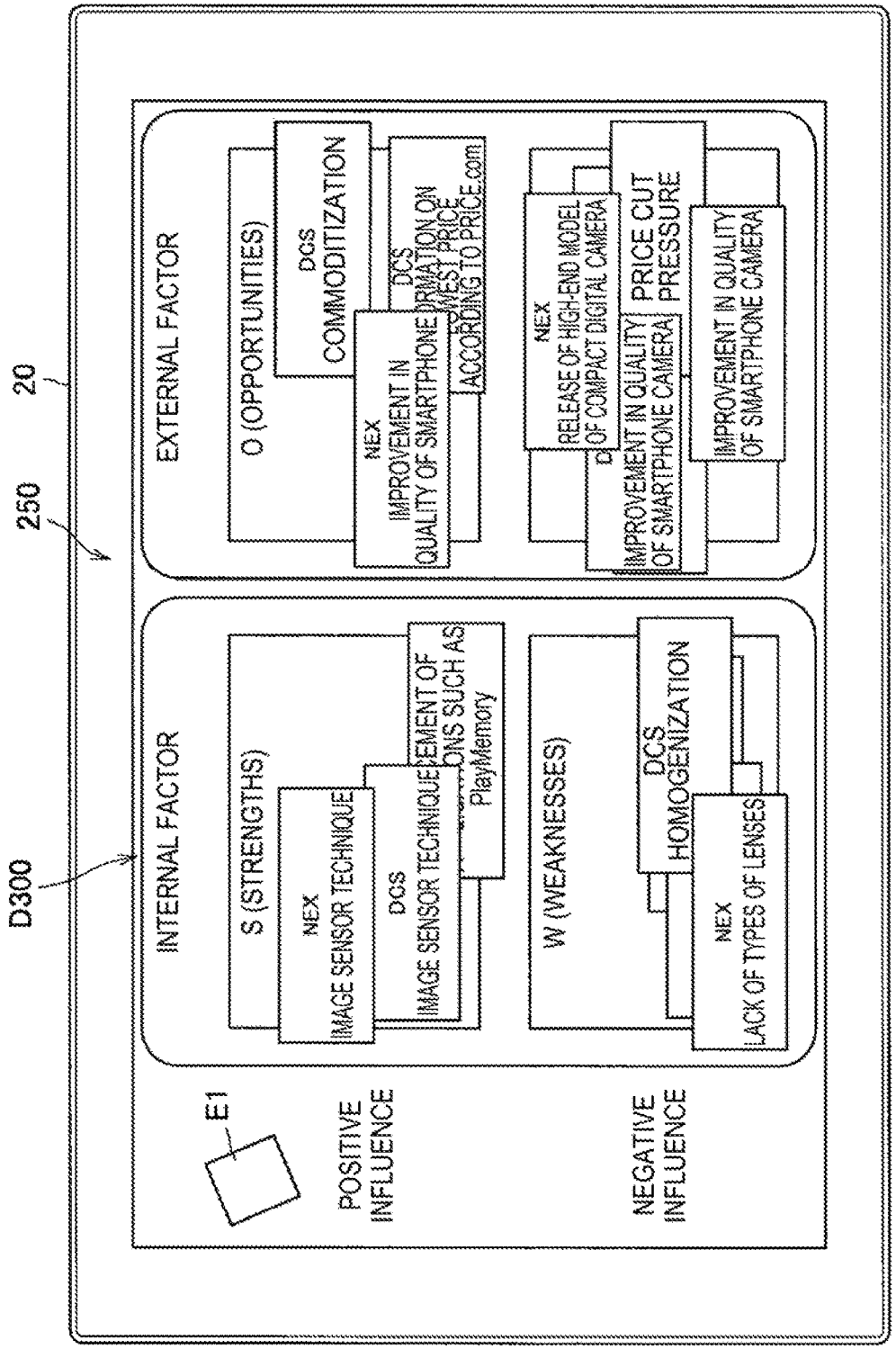
FIG. 24 shows a display example of a merge result of a plurality of pieces of storage data according to SWOT analysis.

The data acquisition unit 111 in the server apparatus 10 can acquire the merge request from the client apparatus 20 via the communication unit 140. The data processing unit 112 can select the plurality of pieces of the storage data corresponding to the merge request (pieces of the storage data corresponding to a plurality of respective pieces of the identification information contained in the merge request) from the storage unit 130, and the data processing unit 112 can merge the plurality of pieces of the storage data. The output control unit 212 can display a merge result of the plurality of pieces of the storage data on the data generation screen D300. FIG. 24 shows a display example of a merge result of a plurality of pieces of storage data according to the SWOT analysis.

Figure 26:
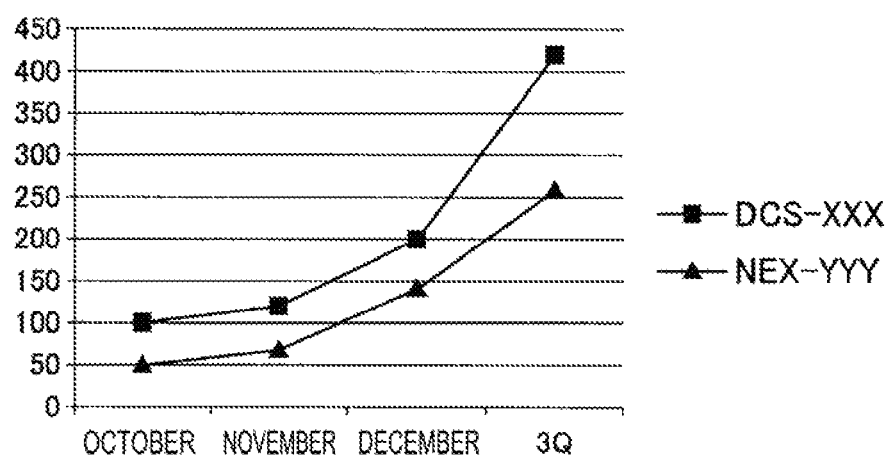
FIG. 26 shows a display example of a graph created on the basis of storage data according to graph analysis.

FIG. 25 shows an example of storage data according to graph analysis. When referring to FIG. 25, the number of sold products in each department in an A area is associated with a graph analysis template and is stored as storage data. FIG. 26 shows a display example of a graph created on the basis of the storage data according to the graph analysis. When referring to FIG. 26, the data processing unit 112 creates a graph on the basis of the storage data shown in FIG. 25. Similarly, the number of sold products in each department in a B area is associated with a graph analysis template and is stored as storage data.

Figure 27:
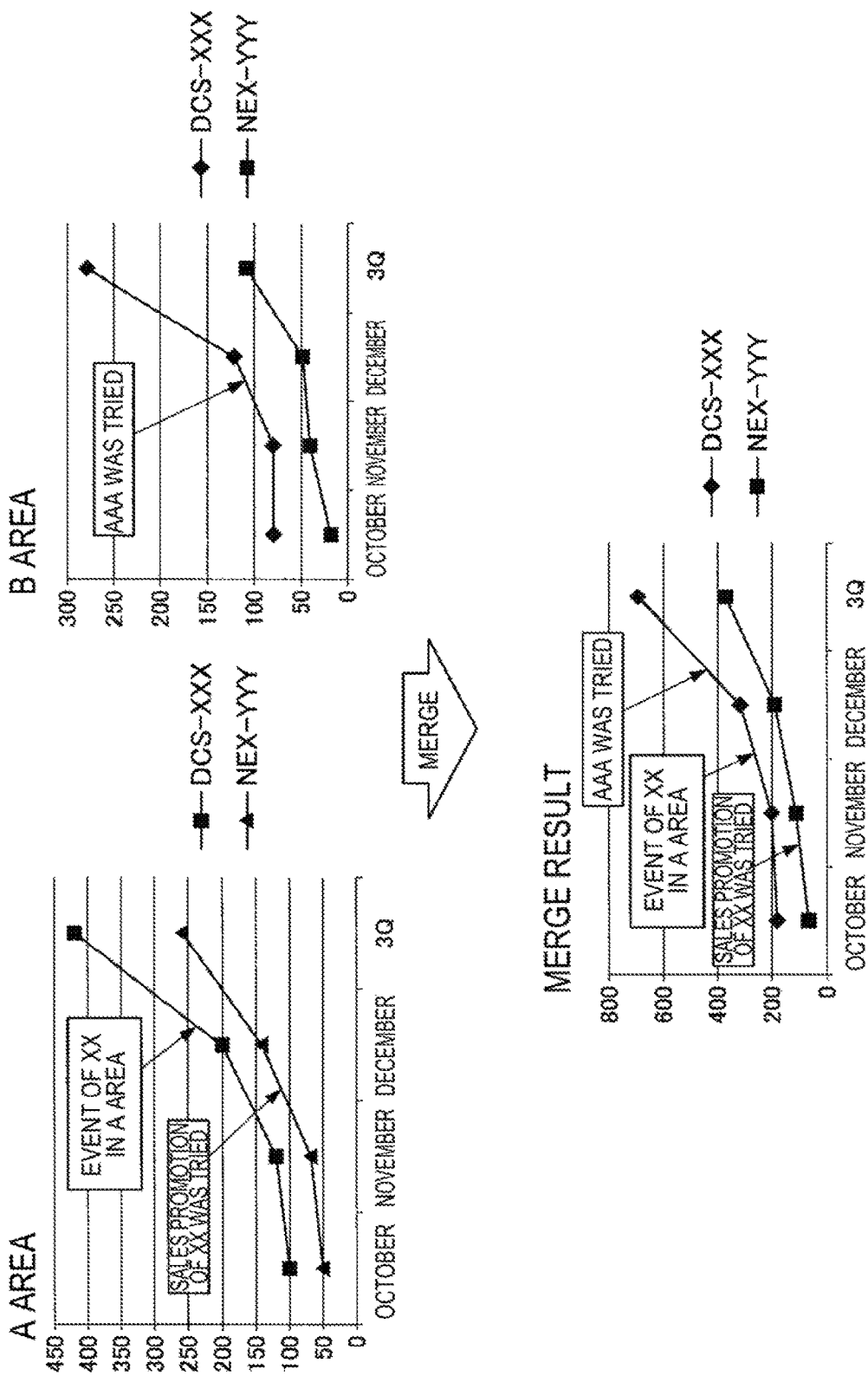
FIG. 27 shows a display example of a merge result of a plurality of pieces of storage data according to graph analysis.

FIG. 27 shows a display example of a merge result of the plurality of pieces of the storage data according to the graph analysis. When referring to FIG. 27, the number of sold products in each department in the A area is associated with a graph creation template and is stored as storage data. Data "Event of XX in A area", "Sales promotion of XX was tried", and the like are also associated with the graph creation template. The number of sold products in each department in the B area is associated with a graph creation template and is stored as storage data. Data "AAA was tried" and the like are also associated with the graph creation template.

For example, the data processing unit 112 can merge the number of sold products in each department in the A area with the number of sold products in each department in the B area. More specifically, as shown in FIG. 27, the data processing unit 112 may add the numbers of sold products in the same department in the A area and the B area. Further, as shown in FIG. 27, the data processing unit 112 may also merge the data "Event of XX in A area", "Sales promotion of XX was tried", "AAA was tried", and the like. Such merging may be performed in the client apparatus 20 in an organization higher than the A area and the B area.

Figure 28:
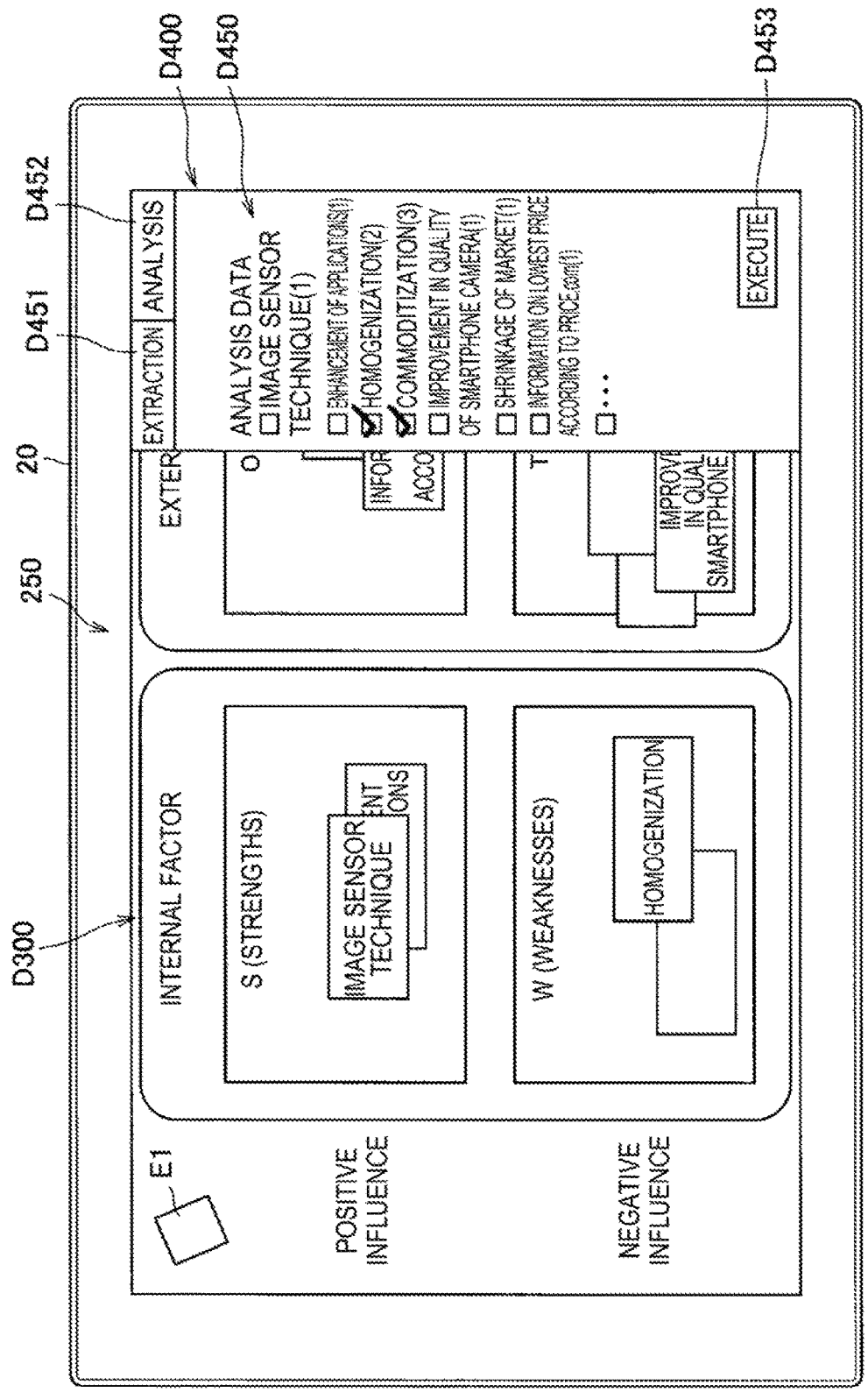
FIG. 28 shows a display example of the number of the same or similar pieces of data calculated on the basis of a plurality of pieces of storage data according to SWOT analysis.

In the case where a plurality of pieces of storage data are selected as targets to be compared, the data processing unit 112 may compare the plurality of pieces of the storage data and may extract the same or similar data. FIG. 28 shows a display example of the number of pieces of the same or similar data calculated on the basis of a plurality of pieces of storage data according to the SWOT analysis. As shown in FIG. 28, the operation selection screen D400 may include an extraction tab D451 and an analysis tab D452. In the case where the analysis tab D452 is selected, the operation selection screen D400 may include an analysis data selection section D450.

The data processing unit 112 may calculate the number of a plurality of pieces of storage data for each same or similar data. In the example shown in FIG. 28, the data processing unit 112 calculates existence of one case of "Image sensor technique", one case of "Enhancement in applications", two cases of "Homogenization", three cases of "Commoditization", one case of "Improvement in quality of smartphone camera", one case of "Shrinkage of market", and one case of "Information on lowest price according to price.com" among the plurality of pieces of the storage data. The output control unit 212 displays such calculation results on the analysis data selection section D450.

Figure 29:
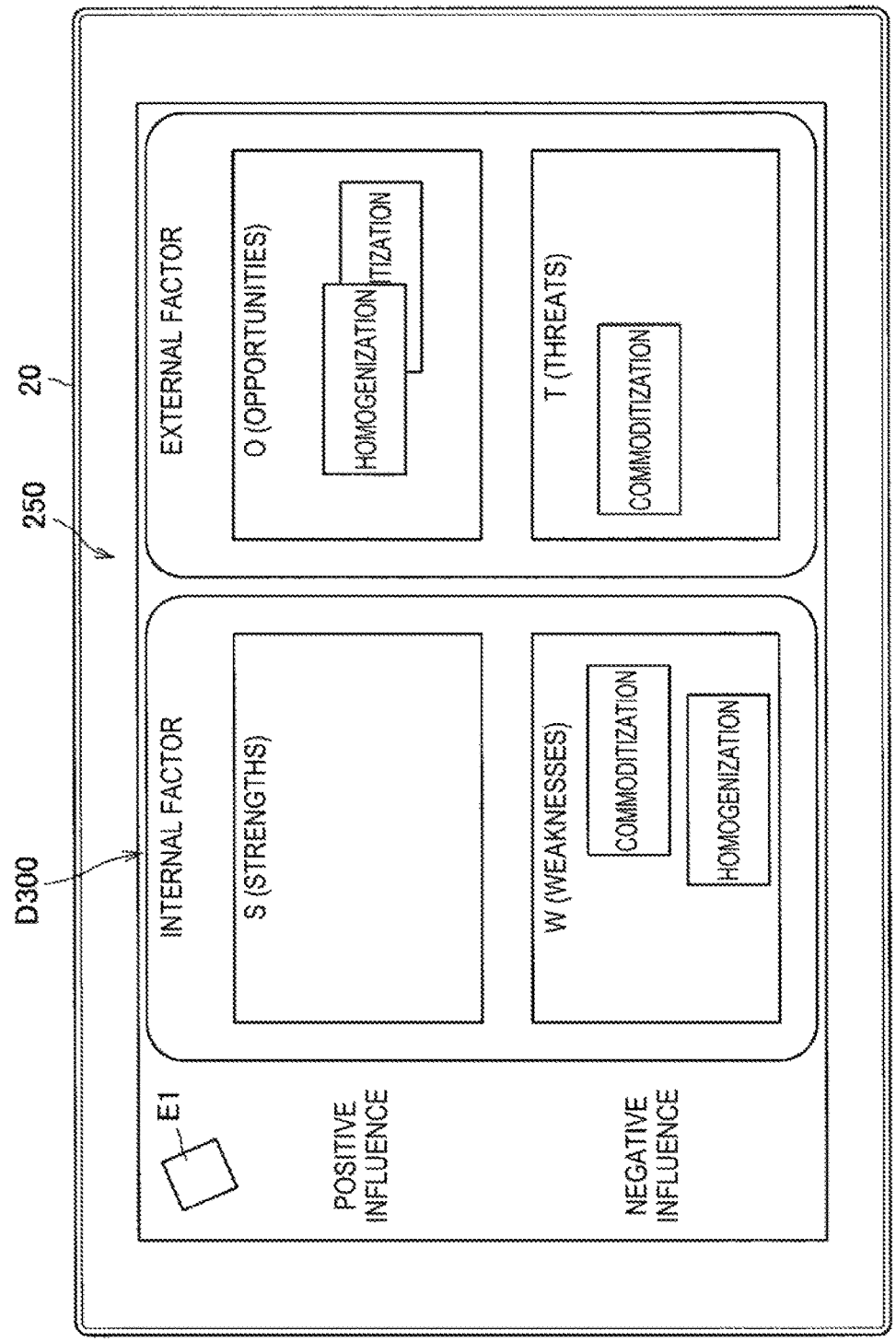
FIG. 29 shows a display example of extracted data.

As shown in FIG. 28, the analysis data selection section D450 may include an execution button D453. When the execution button D453 is selected by user's operation, the output control unit 212 can provide a selection result in the analysis data selection section D450 to the server apparatus 10 via the communication unit 240. The data provision unit 113 in the server apparatus 10 can extract data corresponding to the selection result and can provide the extracted data to the client apparatus 20 via the communication unit 140. FIG. 29 shows a display example of the extracted data.

As shown in FIG. 28, in the case where "Homogenization" and "Commoditization" are selected and the execution button D453 is selected by user's operation in the analysis data selection section D450, the output control unit 212 can provide such selection results to the server apparatus 10 via the communication unit 240. The data provision unit 113 in the server apparatus 10 can extract the data "Homogenization" and "Commoditization" corresponding to the selection results and can provide the extracted data to the client apparatus 20 via the communication unit 140. As shown in FIG. 29, the output control unit 212 can display the data "Homogenization" and "Commoditization". The data may be extracted in the client apparatus 20 in a high organization.

5. HARDWARE CONFIGURATION EXAMPLE OF SERVER APPARATUS

Figure 30:
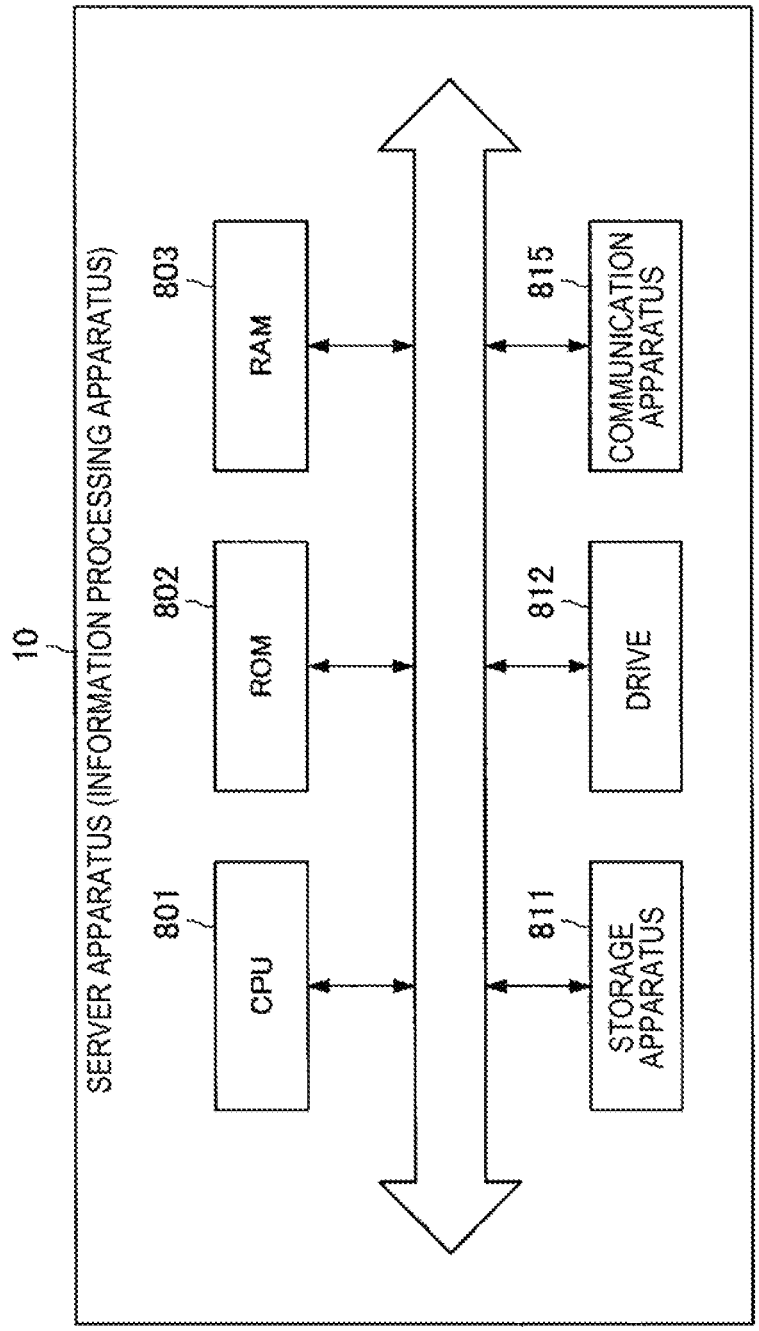
FIG. 30 shows a hardware configuration example of a server apparatus according to an embodiment of the present disclosure.

To continue, a hardware configuration example of the server apparatus 10 according to an embodiment of the present disclosure will be described. FIG. 30 is a figure which shows a hardware configuration example of the server apparatus 10 according to an embodiment of the present disclosure. However, the hardware configuration example shown in FIG. 30 merely shows an example of the hardware configuration of the server apparatus 10. Therefore, the hardware configuration of the server apparatus 10 is not limited to the example shown in FIG. 30.

As shown in FIG. 30, the server apparatus 10 includes a CPU (Central Processing Unit) 801, a ROM (Read Only Memory) 802, a RAM (Random Access Memory) 803, a storage apparatus 811, a drive 812, and a communication apparatus 815.

The CPU 801 functions as an operation processing apparatus and a control apparatus, and controls all the operations within the server apparatus 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The storage apparatus 811 is an apparatus for data storage constituted as an example of a storage section of the server apparatus 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the server apparatus 10 or is externally attached. The drive 812 reads information recorded on a removable storage medium, such as a mounted magnetic disk, an optical disk, a magneto-optical disk, or a semiconductor memory, and outputs the information to the RAM 803. Further, the drive 812 can write information to the removable storage medium.

The communication apparatus 815 is, for example, a communication interface constituted by a communication device or the like for connecting to a network. Further, the communication apparatus 815 may be a communication apparatus adaptive to wireless LAN (Local Area Network), a communication apparatus adaptive to LTE (Long Term Evolution), or a wired communication apparatus which performs wired communication. For example, it is possible for the communication apparatus 815 to communicate with other apparatuses via a network.

Heretofore, a hardware configuration example of the server apparatus 10 according to an embodiment of the present disclosure has been described.

6. HARDWARE CONFIGURATION EXAMPLE OF CLIENT APPARATUS

Figure 31:
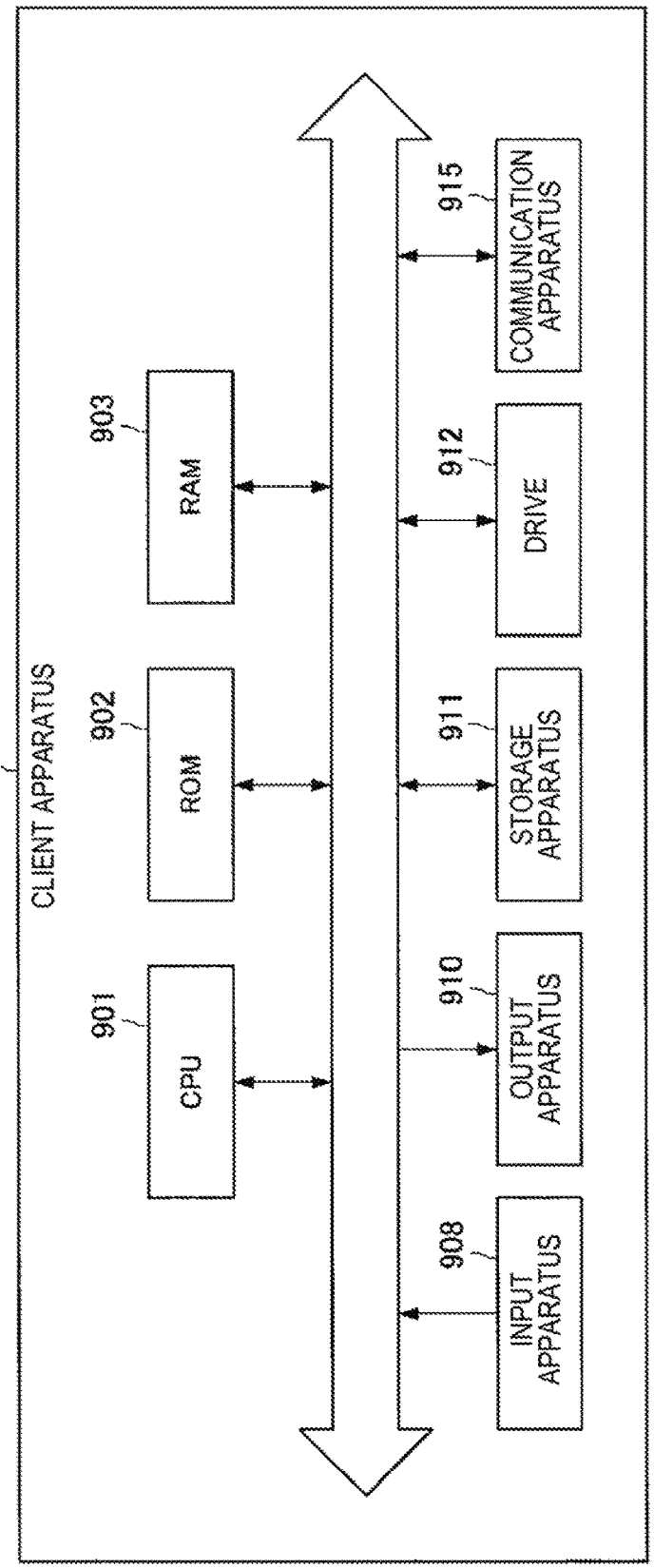
FIG. 31 shows a hardware configuration example of a client apparatus according to this embodiment.

To continue, a hardware configuration example of the client apparatus 20 according to an embodiment of the present disclosure will be described. FIG. 31 is a figure which shows a hardware configuration example of the client apparatus 20 according to an embodiment of the present disclosure. However, the hardware configuration example shown in FIG. 31 merely shows an example of the hardware configuration of the client apparatus 20. Therefore, the hardware configuration of the client apparatus 20 is not limited to the example shown in FIG. 31.

As shown in FIG. 31, the client apparatus 20 includes a CPU (Central Processing Unit) 901, a ROM (Read Only Memory) 902, a RAM (Random Access Memory) 903, an input apparatus 908, an output apparatus 910, a storage apparatus 911, a drive 912, and a communication apparatus 915.

The CPU 901 functions as an operation processing apparatus and a control apparatus, and controls all the operations within the client apparatus 20 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrary change in this execution. These sections are mutually connected by a host bus constituted from a CPU bus or the like.

The input apparatus 908 includes an operation section, such as a mouse, a keyboard, a touch panel, buttons, a microphone, switches or leavers, for a user to input information, and an input control circuit which generates an input signal based on an input by the user, and outputs the input signal to the CPU 901. By operating the input apparatus 908, it is possible for the user of the client apparatus 20 to input various data for the client apparatus 20 and to instruct the process operations.

The output apparatus 910 may include, for example, a display device such as a liquid crystal display (LCD) apparatus, an OLED (Organic Light Emitting Diode) apparatus, or a lamp. In addition, the output apparatus 910 may include a sound output apparatus such as a speaker or headphones. For example, the display device displays an imaged image or a generated image. On the other hand, the sound output apparatus converts sound data and outputs sounds.

The storage apparatus 911 is an apparatus for data storage constituted as an example of a storage section of the client apparatus 20. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the client apparatus 20 or is externally attached. The drive 912 reads information recorded on a removable storage medium, such as a mounted magnetic disk, an optical disk, a magneto-optical disk, or a semiconductor memory, and outputs the information to the RAM 903. Further, the drive 912 can write information to the removable storage medium.

The communication apparatus 915 is, for example, a communication interface constituted by a communication device or the like for connecting to a network. Further, the communication apparatus 915 may be a communication apparatus adaptive to wireless LAN (Local Area Network), a communication apparatus adaptive to LTE (Long Term Evolution), or a wired communication apparatus which performs wired communication. For example, it is possible for the communication apparatus 915 to communicate with other apparatuses via a network.

Heretofore, a hardware configuration example of the client apparatus 20 according to an embodiment of the present disclosure has been described.

7. CONCLUSION

As described above, according to the embodiment of the present disclosure, there is provided the server apparatus 10 including the data provision unit 113 that provides, to the client apparatus 20, a transition source template corresponding to a selection request from the client apparatus 20 and the data processing unit 112 that, in the case where a factor included in the transition source template and a factor included in a transition destination template corresponding to a switching request from the client apparatus 20 are common, associates data associated with the factor included in the transition source template with the factor included in the transition destination template.

This configuration allows a user to save time and effort required for generating data on the basis of another template with the use of data that has already been generated on the basis of one template.

When a condition is applied to information input to the above sheet, the information input to the sheet can also be used in an existing template. For example, there may be applied a condition in which, in the case where there is data in which a value in this month is predetermined times (for example, 1.5 times) as large as a value in a previous month, the data is associated with S (strengths) in a SWOT analysis template.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the operation of the information processing system 1 is not necessarily performed in time series in order described in the flowchart. For example, the operation of the information processing system 1 may be performed in a different order from that described in the flowchart, or at least a part of the operation described in the flowchart may be performed in parallel.

Also, hardware embedded in the computer, such as a CPU, a ROM, and a RAM, can be implemented by a program for exhibiting the same functions as the configuration of the above-described server apparatus 10. Also, it is possible to provide a non-transitory computer-readable recording medium storing the relevant program.

Also, hardware embedded in the computer, such as a CPU, a ROM, and a RAM, can be implemented by a program for exhibiting the same functions as the configuration of the above-described client apparatus 20. Also, it is possible to provide a non-transitory computer-readable recording medium storing the relevant program.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus, including:

a data provision unit configured to provide, to a client apparatus, a first template corresponding to a selection request from the client apparatus; and a data processing unit configured to, in the case where a factor included in the first template and a factor included in a second template corresponding to a switching request from the client apparatus are common, associate data associated with the factor included in the first template with the factor included in the second template.

(2)

The information processing apparatus according to (1), wherein the data processing unit associates the data with the factor included in the first template in response to a data processing request from the client apparatus.

(3)

The information processing apparatus according to (2), wherein the data processing unit specifies, on the basis of the data processing request containing a position of the data arranged on the first template, a factor corresponding to the position and associates the data with the specified factor.

(4)

The information processing apparatus according to (2) or (3), wherein the data processing unit stores the data associated with the factor included in the first template as storage data in a storage unit.

(5)

The information processing apparatus according to (4), wherein, in the case where a plurality of pieces of the storage data are selected as targets to be merged, the data processing unit merges the plurality of pieces of the storage data.

(6)

The information processing apparatus according to (4) or (5), wherein, in the case where a plurality of pieces of the storage data are selected as targets to be compared, the data processing unit compares the plurality of pieces of the storage data and extracts the same or similar data.

(7)

The information processing apparatus according to any one of (1) to (6), wherein the data processing unit associates data with the factor included in the second template in response to a data processing request from the client apparatus.

(8)

The information processing apparatus according to (7), wherein the data processing unit specifies, on the basis of the data processing request containing a position of the data arranged on the second template, a factor corresponding to the position and associates the data with the specified factor.

(9)

The information processing apparatus according to any one of (1) to (8), wherein the data provision unit provides the second template and data associated with the second template to the client apparatus.

(10)

The information processing apparatus according to any one of (1) to (9), wherein the data provision unit provides the data associated with the factor included in the first template to the client apparatus in response to a data extraction request from the client apparatus.

(11)

The information processing apparatus according to (10), wherein the data provision unit provides, to the client apparatus, the data associated with the factor specified on the basis of the data extraction request containing the factor included in the first template.

(12)

The information processing apparatus according to any one of (1) to (11), wherein the data processing unit integrates a plurality of pieces of data associated with the first template in response to a data integration request from the client apparatus.

(13)

The information processing apparatus according to (12), wherein the data processing unit specifies the plurality of pieces of the data on the basis of the data integration request containing pieces of identification information of the plurality of respective pieces of the data and deletes any one of the specified plurality of pieces of the data.

(14)

The information processing apparatus according to any one of (1) to (13), wherein the data processing unit selects the first template on the basis of the selection request containing identification information of the template.

(15)

The information processing apparatus according to any one of (1) to (14), wherein the data processing unit selects the second template on the basis of the switching request containing identification information of the template.

(16)

The information processing apparatus according to any one of (1) to (15), wherein, in the case where the switching request contains the factor included in the first template, the data provision unit associates data associated with the factor with the factor included in the second template.

(17)

An information processing method, including:

providing, to a client apparatus, a first template corresponding to a selection request from the client apparatus; and in the case where a factor included in the first template and a factor included in a second template corresponding to a switching request from the client apparatus are common, associating, by using a processor, data associated with the factor included in the first template with the factor included in the second template.

(18)

A program for causing a computer to function as an information processing apparatus including a data provision unit configured to provide, to a client apparatus, a first template corresponding to a selection request from the client apparatus; and a data processing unit configured to, in the case where a factor included in the first template and a factor included in a second template corresponding to a switching request from the client apparatus are common, associate data associated with the factor included in the first template with the factor included in the second template.

REFERENCE SIGNS LIST 1 information processing system
10 server apparatus (information processing apparatus)
20 client apparatus
30 network
110 control unit
111 data acquisition unit
112 data processing unit
113 data provision unit
130 storage unit
140 communication unit
210 control unit
211 input control unit
212 output control unit
220 input unit
230 storage unit
240 communication unit
250 display unit

The invention claimed is:

1. An apparatus, comprising:
processing circuitry configured to
provide, to a client apparatus, a first template corresponding to a selection request from the client apparatus, the first template being a transition source template, the client apparatus arranging data on the first template;
receive, from the client apparatus, a data processing request to transit the data from the first template to a second template, the second template being a transition destination template;
associate the data with factors included in the first template in response to receiving the data processing request from the client apparatus;
transmit, to the client apparatus, a data processing response in response to completing the association of the data;
receive, from the client apparatus, a switching request for switching the first template with the second template in response to transmitting the data processing response;
determine whether a first factor of the factors included in the first template and a second factor included in the second template are common;
associate first data associated with the first factor included in the first template with the second factor included in the second template in a case where the first factor and the second factor are determined to be common and in a case where a selection of the first factor is received from the client apparatus;
store, in a memory of the apparatus, the first data in a table including selectable factors, the selectable factors and the first data being associated with one or more factors included in the first template; and
transmit both of the second template and the first data to the client apparatus, the second template being associated with the first data by the client apparatus.

2. The information processing apparatus according to claim 1,
wherein the processor specifies, on the basis of the data processing request containing a position of the data arranged on the first template, a factor corresponding to the position and associates the data with the specified factor.

3. The information processing apparatus according to claim 1,
wherein the processing circuitry stores the data associated with the first factor included in the first template as storage data in the memory.

4. The information processing apparatus according to claim 3,
wherein, in the case where a plurality of pieces of the storage data are selected as targets to be merged, the processing circuitry merges the plurality of pieces of the storage data.

5. The information processing apparatus according to claim 3,
wherein, in the case where a plurality of pieces of the storage data are selected as targets to be compared, the processing circuitry compares the plurality of pieces of the storage data and extracts the same or similar data.

6. The information processing apparatus according to claim 1,
wherein the processing circuitry associates data with the first factor included in the second template in response to a data processing request from the client apparatus.

7. The information processing apparatus according to claim 6,
wherein the processing circuitry specifies, on the basis of the data processing request containing a position of the data arranged on the second template, a factor corresponding to the position and associates the data with the specified factor.

8. The information processing apparatus according to claim 1,
wherein the processing circuitry provides the second template and data associated with the second template to the client apparatus.

9. The information processing apparatus according to claim 1,
wherein the processing circuitry provides the data associated with the first factor included in the first template to the client apparatus in response to a data extraction request from the client apparatus.

10. The information processing apparatus according to claim 9,
wherein the processing circuitry provides, to the client apparatus, the data associated with the first factor specified on the basis of the data extraction request containing the first factor included in the first template.

11. The information processing apparatus according to claim 1,
wherein the processing circuitry integrates a plurality of pieces of data associated with the first template in response to a data integration request from the client apparatus.

12. The information processing apparatus according to claim 11,
wherein the processing circuitry specifies the plurality of pieces of the data on the basis of the data integration request containing pieces of identification information of the plurality of respective pieces of the data and deletes any one of the specified plurality of pieces of the data.

13. The information processing apparatus according to claim 1,
wherein the processing circuitry selects the first template on the basis of the selection request containing identification information of the first template.

14. The information processing apparatus according to claim 1,
wherein the processing circuitry selects the second template on the basis of the switching request containing identification information of the second template.

15. The information processing apparatus according to claim 1,
wherein, in the case where the switching request contains the first factor included in the first template, the processing circuitry associates the data associated with the first factor with the second factor included in the second template.

16. The apparatus of claim 1, wherein
the apparatus is a server including at least the processing circuitry, the memory and a communication interface,
the communication interface is configured to communicate with at least the client apparatus having a display via a wireless network,
the display is configured to display acquired data from the server via the communication interface, and
the communication interface is configured to receive the selection from the client apparatus based on an input performed by a user received by the client apparatus.

17. An information processing method, comprising:
providing, to a client apparatus, a first template corresponding to a selection request from the client apparatus, the first template being a transition source template, the client apparatus arranging data on the first template;
receiving, from the client apparatus, a data processing request to transit the data from the first template to a second template, the second template being a transition destination template;
associating the data with factors included in the first template in response to receiving the data processing request from the client apparatus;
transmitting, to the client apparatus, a data processing response in response to completing the association of the data;
receiving, from the client apparatus, a switching request for switching the first template with the second template in response to transmitting the data processing response;
determining whether a first factor of the factors included in the first template and a second factor included in the second template are common;
associating first data associated with the first factor included in the first template with the second factor included in the second template in a case where the first factor and the second factor are determined to be common and in a case where a selection of the first factor is received from the client apparatus;
storing, in a memory of the apparatus, the first data in a table including selectable factors, the selectable factors and the first data being associated with one or more factors included in the first template; and
transmitting both of the second template and the first data to the client apparatus, the second template being associated with the first data by the client apparatus.

18. A non-transitory computer-readable medium storing a program which when executed by a computer cause the computer to perform an information processing method, the method comprising:
providing, to a client apparatus, a first template corresponding to a selection request from the client apparatus, the first template being a transition source template, the client apparatus arranging data on the first template;
receiving, from the client apparatus, a data processing request to transit the data from the first template to a second template, the second template being a transition destination template;
associating the data with factors included in the first template in response to receiving the data processing request from the client apparatus;
transmitting, to the client apparatus, a data processing response in response to completing the association of the data;
receiving, from the client apparatus, a switching request for switching the first template with the second template in response to transmitting the data processing response;
determining whether a first factor of the factors included in the first template and a second factor included in the second template are common;
associating first data associated with the first factor included in the first template with the second factor included in the second template in a case where the first factor and the second factor are determined to be common and in a case where a selection of the first factor is received from the client apparatus;
storing, in a memory of the apparatus, the first data in a table including selectable factors, the selectable factors and the first data being associated with one or more factors included in the first template; and
transmitting both of the second template and the first data to the client apparatus, the second template being associated with the first data by the client apparatus.

* * * * *